(12) United States Patent
Ito

(10) Patent No.: US 8,840,807 B2
(45) Date of Patent: *Sep. 23, 2014

(54) POLYMERIZABLE COMPOUND

(75) Inventor: Maiko Ito, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 13/695,288

(22) PCT Filed: May 9, 2011

(86) PCT No.: PCT/JP2011/060620
§ 371 (c)(1),
(2), (4) Date: Oct. 30, 2012

(87) PCT Pub. No.: WO2011/142299
PCT Pub. Date: Nov. 17, 2011

(65) Prior Publication Data
US 2013/0048912 A1 Feb. 28, 2013

(30) Foreign Application Priority Data

May 10, 2010 (JP) ................. 2010-108284

(51) Int. Cl.
| | | |
|---|---|---|
| C09K 19/54 | (2006.01) | |
| C09K 19/52 | (2006.01) | |
| C09K 19/06 | (2006.01) | |
| C09K 19/00 | (2006.01) | |
| C07C 69/00 | (2006.01) | |
| C08F 118/02 | (2006.01) | |
| C08F 122/10 | (2006.01) | |
| C08F 222/10 | (2006.01) | |
| C09K 19/30 | (2006.01) | |
| C09K 19/04 | (2006.01) | |

(52) U.S. Cl.
CPC ....... *C09K 19/3001* (2013.01); *C08F 222/1006* (2013.01); *C09K 2019/0448* (2013.01)
USPC ................. 252/299.5; 252/299.01; 252/299.6; 428/1.1; 526/72; 526/319; 526/321; 560/141

(58) Field of Classification Search
USPC ................ 252/299.01, 299.5, 299.6; 428/1.1; 526/72, 319, 321; 560/141
See application file for complete search history.

(56) References Cited

U.S. PATENT DOCUMENTS

2013/0003009 A1* 1/2013 Furusato et al. ............. 349/183

FOREIGN PATENT DOCUMENTS

| | | |
|---|---|---|
| EP | 1889894 | 2/2008 |
| JP | 63-215653 | 9/1988 |
| JP | 2003-307720 | 10/2003 |
| JP | 2004-131704 | 4/2004 |
| JP | 2006-133619 | 5/2006 |
| JP | 2006-308840 | 11/2006 |
| JP | 2008-203697 | 9/2008 |
| WO | 2008/149766 | 12/2008 |

* cited by examiner

*Primary Examiner* — Geraldina Visconti
(74) *Attorney, Agent, or Firm* — Jianq Chyun IP Office

(57) ABSTRACT

To provide a polymerizable compound having a high solubility in a liquid crystal composition, and laterally having a ring structure; a liquid crystal composition containing the compound, and a liquid crystal display device using the composition; and the polymerizable compound includes a compound represented by formula (1):

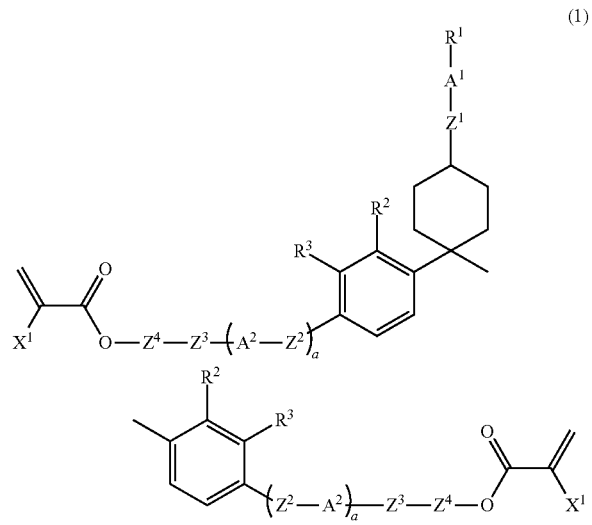

wherein, for example,
$R^1$ is hydrogen or alkyl having 1 to 20 carbons, $R^2$ and $R^3$ are each independently hydrogen or methyl;
$A^1$ and $A^2$ are a single bond, 1,4-phenylene or 1,4-cyclohexylene;
$Z^1$ is a single bond or alkylene having 1 to 3 carbons, $Z^2$ is —O—, —COO—, —OCO— or alkylene having 1 to 6 carbons, $Z^3$ is a single bond or —O—, $Z^4$ is a single bond or alkylene having 2 to 20 carbons;
$X^1$ is hydrogen, halogen or alkyl having 1 to 3 carbons; and a is 0 or 1.

17 Claims, No Drawings

POLYMERIZABLE COMPOUND

CROSS-REFERENCE TO RELATED APPLICATION

This application is a 371 of international application of PCT application serial no. PCT/JP2011/060620, filed on May 9, 2011, which claims the priority benefit of Japan application no. 2010-108284, filed on May 10, 2010. The entirety of each of the above-mentioned patent applications is hereby incorporated by reference herein and made a part of this specification.

TECHNICAL FIELD

The invention relates to a polymerizable compound having a cyclohexyldiphenyl skeleton, a composition having the compound, a polymer obtained from the composition, and an application thereof.

BACKGROUND ART

A liquid crystal display device in which a polymerizable compound is added to a liquid crystal composition is known. For example, in a display having a polymer sustained alignment (PSA) mode, a small amount (0.3% by weight, for example, less than 1% by weight, generally) of polymerizable compound is added to the liquid crystal composition. After introduction of the liquid crystal composition into a liquid crystal display cell, only the polymerizable compound is polymerized generally by performing irradiation with ultraviolet (UV) light in a state of applying voltage between electrodes. A liquid crystal display device in which a polymer structure is formed within the device can be obtained by such an operation. The liquid crystal display device obtained is characterized by a short response time, and thus a degree of image sticking can be improved (Patent literature Nos. 1 to 4).

Moreover, a polymerizable compound having a cyclohexyldiphenyl skeleton is known as a monomer component of a polymer material that has a high thermal resistance, a high refractive index and a high transparency (Patent literature Nos. 5 to 7). However, an effect or usefulness when adding the polymerizable compound having the cyclohexyldiphenyl skeleton to the liquid crystal composition is not described.

CITATION LIST

Patent Literature

Patent literature No. 1: JP 2003-307720 A.
Patent literature No. 2: JP 2004-131704 A.
Patent literature No. 3: JP 2006-133619 A.
Patent literature No. 4: EP 1889894 A.
Patent literature No. 5: JP S63-215653 A.
Patent literature No. 6: JP 2006-308840 A.
Patent literature No. 7: JP 2008-203697 A.

SUMMARY OF INVENTION

Technical Problem

In a PSA mode display that has been applied so far, a polymerizable compound having a rigid skeleton is used. In general, the compounds reputedly have a high capability for aligning liquid crystal molecules. On the other hand, the compounds have a poor solubility in a liquid crystal composition, and cannot be added in a large amount.

One of the aims of the invention is to provide a polymerizable compound having a high solubility in a liquid crystal composition, and laterally having a ring structure or a ring structure with a side chain. Another aim is to provide a liquid crystal composition containing the compound, and a liquid crystal display device including such a composition. A further aim is to provide a polymer obtained from the composition containing the compound, an optical device including the polymer, and so forth.

Solution to Problem

The inventors of the invention have focused attention on a skeletal structure of a polymerizable compound for use in a PSA mode display, and have found that solubility can be improved by laterally introducing a ring structure or a ring structure with a side chain. Moreover, the inventors have also found that a liquid crystal display device obtained by introducing a liquid crystal composition containing compound (1) of the invention into a liquid crystal display cell and curing the polymerizable compound by irradiation with UV while applying voltage has a short response time, and thus have completed the invention based on the findings.

The invention concerns a compound represented by formula (1), a liquid crystal composition containing the compound represented by formula (1), and an optical device including the compound.

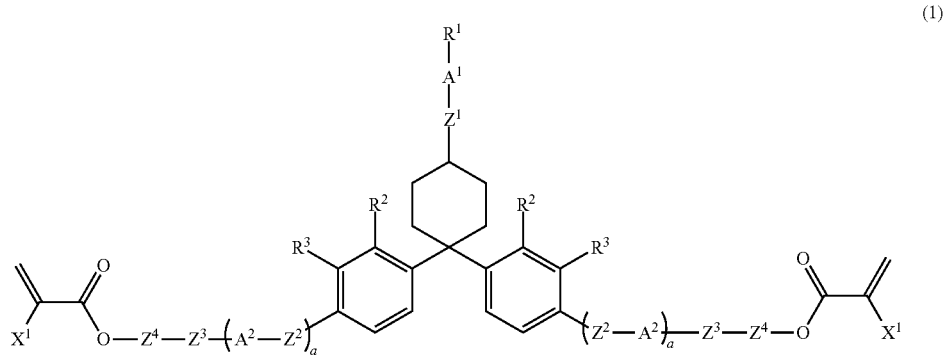

(1)

Wherein, $R^1$ is hydrogen or alkyl having 1 to 20 carbons, and in the alkyl, arbitrary —$CH_2$— may be replaced by —O—, —CH=CH— or —C≡C—;

$R^2$ and $R^3$ are independently hydrogen or methyl;

$A^1$ is a single bond, 1,4-phenylene or 1,4-cyclohexylene;

$A^2$ is independently 1,4-phenylene or 1,4-cyclohexylene; and in 1,4-phenylene and 1,4-cyclohexylene in $A^1$ and $A^2$, arbitrary hydrogen may be replaced by halogen;

$Z^1$ is a single bond or alkylene having 1 to 3 carbons;

$Z^2$ is independently —O—, —COO—, —OCO or alkylene having 1 to 6 carbons;

$Z^3$ is independently a single bond or —O—;

$Z^4$ is independently a single bond or alkylene having 2 to 20 carbons, and in the alkylene, arbitrary —$CH_2$— may be replaced by —O—;

$X^1$ is independently hydrogen, halogen, alkyl having 1 to 3 carbons or fluoroalkyl having 1 to 3 carbons; and a is independently 0 or 1, however, when a is 0, $R^2$, $R^3$ and $X^1$ are hydrogen and $A^1$, $Z^1$, $Z^3$ and $Z^4$ are a single bond, $R^1$ is alkyl having 4 to 20 carbons, and in the alkyl, arbitrary —$CH_2$— may be replaced by —O—, —CH=CH— or —C≡C—;

when a is 0, $R^2$ is hydrogen, $X^1$ is hydrogen or methyl, $R^3$ is methyl, and $A^1$, $Z^1$, $Z^3$ and $Z^4$ are a single bond, $R^1$ is alkyl having 1 to 20 carbons, and in the alkyl, arbitrary —$CH_2$— may be replaced by —O—, —CH=CH— or —C≡C—;

when a is 0, $R^2$ and $R^3$ are hydrogen, $X^1$ is methyl, and $A^1$, $Z^1$, $Z^3$ and $Z^4$ are a single bond, $R^1$ is alkyl having 2 to 20 carbons, and in the alkyl, arbitrary —$CH_2$— may be replaced by —O—, —CH=CH— or —C≡C—;

when a is 0, $X^1$ is methyl, $R^2$ and $R^3$ are hydrogen, $A^1$ and $Z^1$ are a single bond, $R^1$ is a single bond or alkyl having 1 to 4 carbons, and $Z^3$ is —O—, $Z^4$ is alkylene having 3 to 20 carbons; and when a is 0, $X^1$, $R^1$, $R^2$ and $R^3$ are hydrogen, $A^1$ and $Z^1$ are a single bond, and $Z^3$ is —O—, $Z^4$ is alkylene having 3 to 20 carbons.

Advantageous Effects of Invention

Compound (1) satisfies many of advantages of a high solubility in a liquid crystal composition, and capability of polymerization by irradiation with heat or electromagnetic waves. A liquid crystal display device using the liquid crystal composition containing compound (1) has a short response time and therefore a further improved degree of image sticking than before can be expected.

DESCRIPTION OF EMBODIMENTS

Usage of terms herein is as described below. "Liquid crystal compound" is a generic term for a compound having a liquid crystal phase, and a compound having no liquid crystal phase but being useful as a component of a liquid crystal composition. The liquid crystal compound, the liquid crystal composition and a liquid crystal display device may be expressed as "compound," "composition," and "device," respectively. A compound represented by formula (1) may be expressed as "compound (1)" or "compound of formula (1)." A compound represented by any other formula may also be abbreviated in a similar manner. "Compound (1)" means one compound or two or more compounds represented by formula (1). A same rule also applies to any other compound represented by any other formula. Acrylate and methacrylate may be generically expressed as (meth)acrylate. A ratio of an additive mixed with the composition is expressed in terms of weight percent (% by weight) or weight parts per million (weight ppm) based on the total weight of the liquid crystal composition.

"Arbitrary" means "free selection in not only positions but also numbers." For example, an expression "arbitrary A may be replaced by B, C, D or E" means that one of A may be replaced by B, C, D or E, and that any of a plurality of A may be replaced by any one of B, C, D and E, and also means that at least two of A replaced by B, A replaced by C, A replaced by D, and A replaced by E may be mixed. An expression "arbitrary —$CH_2$— may be replaced by —O—" includes neither a case where both of adjacent —$CH_2$— are replaced by —O— nor a case where —$CH_2$— adjacent to —O— is replaced by —O—. Moreover, when arbitrary —$CH_2$— is replaced by —CH=CH— or —C≡C—, the number of carbons does not exceed a range described herein. For example, $R^1$ in formula (1) is alkyl having 1 to 20 carbons, and in the alkyl, arbitrary —$CH_2$— may be replaced by —CH=CH— or —C≡C—, but the number of carbons in alkyl including alkyl replaced by —CH=CH— or —C≡C— does not exceed 20 in the case.

The invention includes the items described below.

Item 1. A compound represented by formula (1):

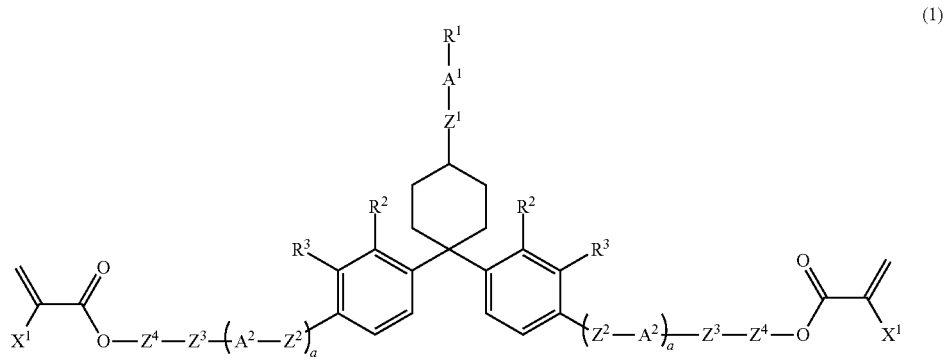

(1)

Wherein, $R^1$ is hydrogen or alkyl having 1 to 20 carbons, and in the alkyl, arbitrary —$CH_2$— may be replaced by —O—, —CH=CH— or —C≡C—;

$R^2$ and $R^3$ are independently hydrogen or methyl;

$A^1$ is a single bond, 1,4-phenylene or 1,4-cyclohexylene;

$A^2$ is independently 1,4-phenylene or 1,4-cyclohexylene;

and in 1,4-phenylene and 1,4-cyclohexylene in $A^1$ and $A^2$, arbitrary hydrogen may be replaced by halogen;

$Z^1$ is a single bond or alkylene having 1 to 3 carbons;

$Z^2$ is independently —O—, —COO—, —OCO— or alkylene having 1 to 6 carbons;

$Z^3$ is independently a single bond or —O—;

$Z^4$ is independently a single bond or alkylene having 2 to 20 carbons, and in the alkylene, arbitrary —$CH_2$— may be replaced by —O—;

$X^1$ is independently hydrogen, halogen, alkyl having 1 to 3 carbons or fluoroalkyl having 1 to 3 carbons; and a is independently 0 or 1, however, when a is 0, $R^2$, $R^3$ and $X^1$ are hydrogen, and $A^1$, $Z^1$, $Z^3$ and $Z^4$ area single bond, $R^1$ is alkyl having 4 to 20 carbons, and arbitrary —$CH_2$— in the alkyl may be replaced by —O—, —CH=CH—, or —C≡C—;

when a is 0, $R^2$ is hydrogen, $X^1$ is hydrogen or methyl, $R^3$ is methyl, and $A^1$, $Z^1$, $Z^3$ and $Z^4$ are a single bond, $R^1$ is alkyl having 1 to 20 carbons, and in the alkyl, arbitrary —$CH_2$— may be replaced by —O—, —CH=CH— or —C≡C—;

when a is 0, $R^2$ and $R^3$ are hydrogen, $X^1$ is methyl, and $A^1$, $Z^1$, $Z^3$ and $Z^4$ are a single bond, $R^1$ is alkyl having 2 to 20 carbons, and in the alkyl, arbitrary —$CH_2$— may be replaced by —O—, —CH=CH— or —C≡C—;

when a is 0, $X^1$ is methyl, $R^2$ and $R^3$ are hydrogen, $A^1$ and $Z^1$ are a single bond, $R^1$ is a single bond or alkyl having 1 to 4 carbons, and $Z^3$ is —O—, $Z^4$ is alkylene having 3 to 20 carbons; and when a is 0, $X^1$, $R^1$, $R^2$ and $R^3$ are hydrogen, $A^1$ and $Z^1$ are a single bond, and $Z^3$ is —O—, $Z^4$ is alkylene having 3 to 20 carbons.

Item 2. The compound according to item 1, wherein, in formula (1) according to item 1, $A^1$ is 1,4-phenylene or 1,4-cyclohexylene.

Item 3. The compound according to item 2, wherein, in formula (1) according to item 1, $R^1$ is hydrogen or alkyl having 1 to 10 carbons, $A^1$ is 1,4-cyclohexylene, $Z^2$ is independently —O—, —COO—, —OCO— or —$CH_2$—, $Z^4$ is independently a single bond or alkylene having 2 to 10 carbons, and $X^1$ is independently hydrogen, fluorine, methyl or trifluoromethyl.

Item 4. The compound according to item 1, wherein, in formula (1) according to item 1, $R^2$ is methyl.

Item 5. The compound according to item 4, wherein, in formula (1) according to item 1, $A^1$ and $Z^1$ are a single bond.

Item 6. The compound according to item 5, wherein, in formula (1) according to item 1, $R^1$ is hydrogen or alkyl having 1 to 10 carbons, $Z^2$ is independently —O—, —COO—, —OCO— or —$CH_2$—, $Z^3$ is independently a single bond or —O—, $Z^4$ is independently a single bond or alkylene having 2 to 10 carbons, $X^1$ is independently hydrogen, fluorine, methyl or trifluoromethyl, and a is independently 0 or 1.

Item 7. The compound according to item 1, wherein, in formula (1) according to item 1, a is 1.

Item 8. The compound according to item 7, wherein, in formula (1) according to item 1, $A^1$ and $Z^1$ are a single bond.

Item 9. The compound according to item 8, wherein, in formula (1) according to item 1, $R^1$ is hydrogen or alkyl having 1 to 10 carbons, $Z^2$ is independently —O—, —COO—, —OCO— or —$CH_2$—, $Z^3$ is independently a single bond or —O—, $Z^4$ is independently a single bond or alkylene having 2 to 10 carbons, and $X^1$ is independently hydrogen, fluorine, methyl or trifluoromethyl.

Item 10. The compound according to item 1, wherein, in formula (1) according to item 1, a is 0.

Item 11. The compound according to item 10, wherein, in formula (1) according to item 1, $A^1$ and $Z^1$ are a single bond.

Item 12. The compound according to item 11, being any one of the compounds described below, wherein:

$X^1$ is hydrogen, $Z^3$ and $Z^4$ are a single bond, and $R^1$ is alkyl having 2, or 4 to 10 carbons; or $X^1$ is hydrogen or methyl, $Z^3$ is a single bond or —O—, $Z^4$ is alkylene having 3 to 10 carbons, and $R^1$ is hydrogen or alkyl having 1 to 10 carbons; or $X^1$ is fluorine, chlorine or trifluoromethyl, $Z^3$ is a single bond or —O—, $Z^4$ is a single bond or alkylene having 2 to 10 carbons, and $R^1$ is hydrogen or alkyl having 1 to 10 carbons.

Item 13. A composition containing the compound according to any one of items 1 to 12.

Item 14. The composition according to item 13, comprising adding the compound according to any one of items 1 to 12 to a non-polymerizable liquid crystal composition.

Item 15. A polymer obtained by polymerizing the compound according to any one of items 1 to 12.

Item 16. A polymer obtained by polymerizing the composition according to item 13 or 14.

Item 17. A liquid crystal display device including at least any one of the compound according to any one of items 1 to 12, the composition according to any one of item 13 or 14, and the polymer according to any one of item 15 or 16.

The invention also includes the following items: (1) the composition, further containing an optically active compound; (2) the composition, further containing the additive such as an antioxidant, an ultraviolet light absorber or an antifoaming agent; (3) an AM device including the composition; (4) a device including the composition, and having a TN, ECB, OCB, IPS, VA or PSA mode; (5) a transmissive device including the composition; (6) Use as a composition having a nematic phase, and (7) use as an optically active composition by adding the optically active compound to the composition.

Next, methods for synthesizing the liquid crystal compounds will be explained. The compounds can be prepared according to known methods. The methods are described in JP H2-503441 A, JP S59-176221 A and JP 2005-35986 A, for example.

A polymerizable group, (meth)acrylate, can be introduced by allowing acrylic acid chlorides to act on a compound having a hydroxyl group.

The compounds whose synthesis methods are not described can be prepared by methods described in books such as Organic Syntheses (John Wily & Sons, Inc.), Organic Reactions (John Wily & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to a known method from the thus obtained compounds. For example, component compounds are mixed and dissolved in each other by heating.

Next, a method for synthesizing the polymerizable compound, the compound of formula (1), will be explained.

Compound (1-a) in which a is 0, $R^2$ and $R^3$ are hydrogen, and $Z^3$ and $Z^4$ are a single bond in formula (1) is prepared according to a process of Scheme 1.

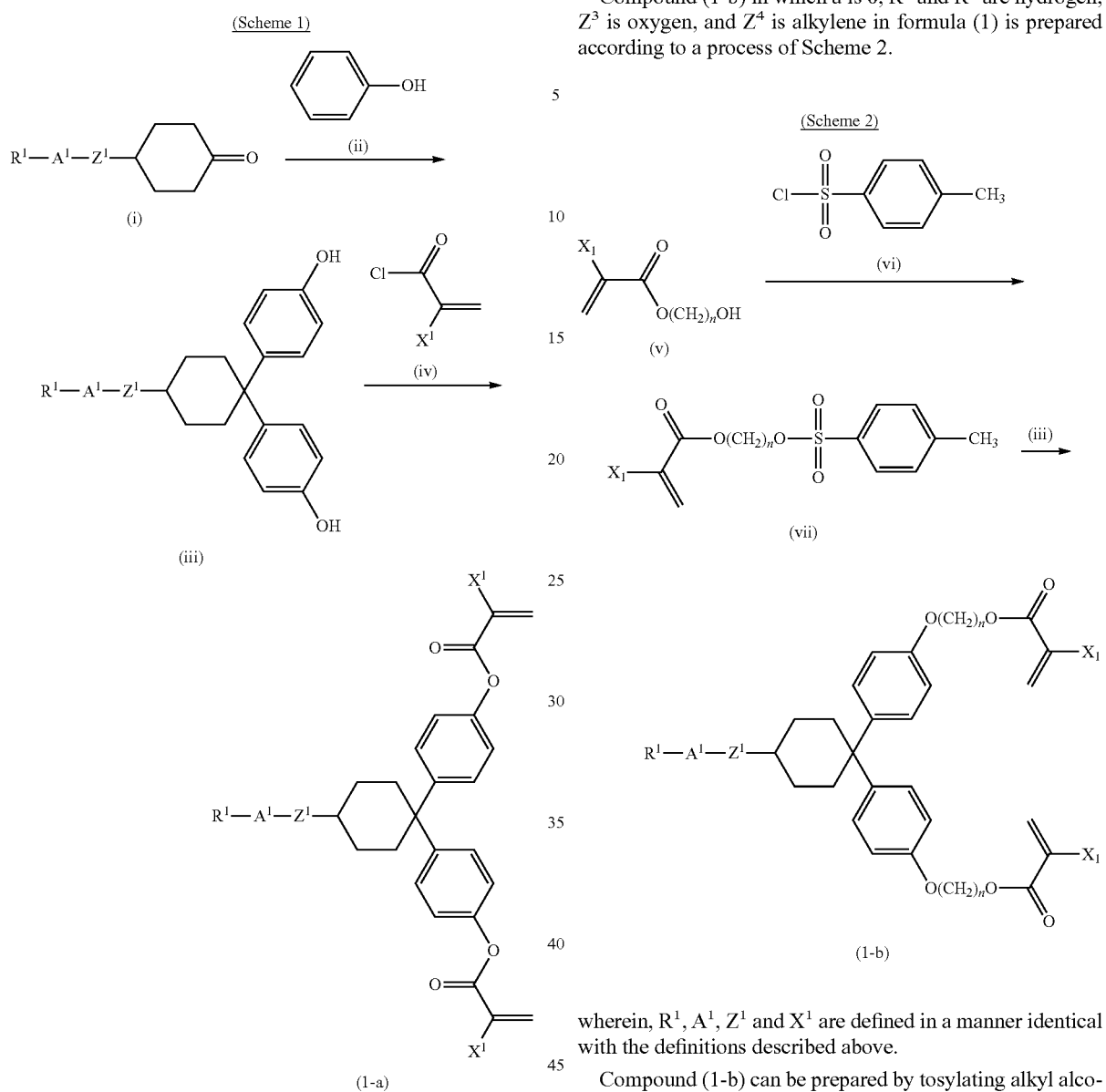

Compound (1-b) in which a is 0, $R^2$ and $R^3$ are hydrogen, $Z^3$ is oxygen, and $Z^4$ is alkylene in formula (1) is prepared according to a process of Scheme 2.

wherein, $R^1$, $A^1$, $Z^1$ and $X^1$ are defined in a manner identical with the definitions described above.

Compound (1-a) can be prepared by preparing compound (iii) by a dehydration reaction between cyclohexanone (i) and phenol (ii), and then allowing compound (iii) to react with acid chloride (iv).

wherein, $R^1$, $A^1$, $Z^1$ and $X^1$ are defined in a manner identical with the definitions described above.

Compound (1-b) can be prepared by tosylating alkyl alcohol (v) of (meth)acrylic acid by using p-toluenesulfonyl chloride (vi), and then allowing the reaction product to react with compound (iii).

According to the methods described above, compounds (1-1-1) to (1-1-6), (1-2-1) to (1-2-7), (1-3-1) to (1-3-9), (1-4-1) to (1-4-6), (1-5-1) to (1-5-6), (1-6-1) to (1-6-13) and (1-7-1) to (1-7-9) are prepared.

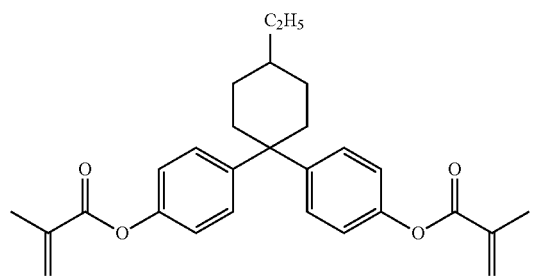

(1-1-1)

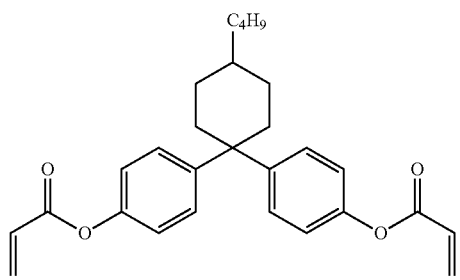

(1-1-2)

-continued
(1-1-3)
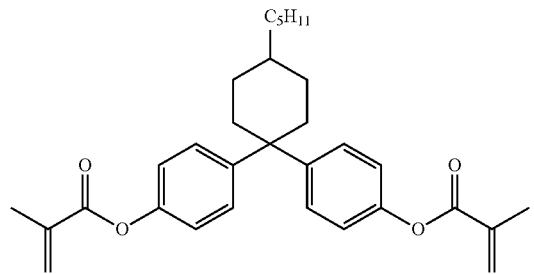
(1-1-4)
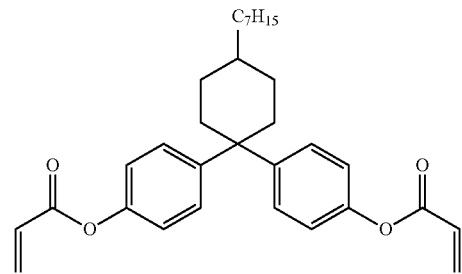
(1-1-5)
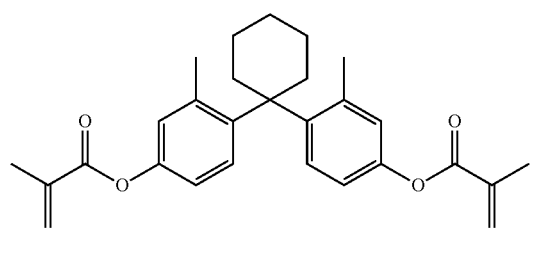
(1-1-6)
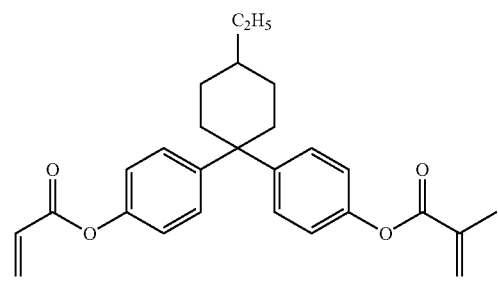
(1-2-1)
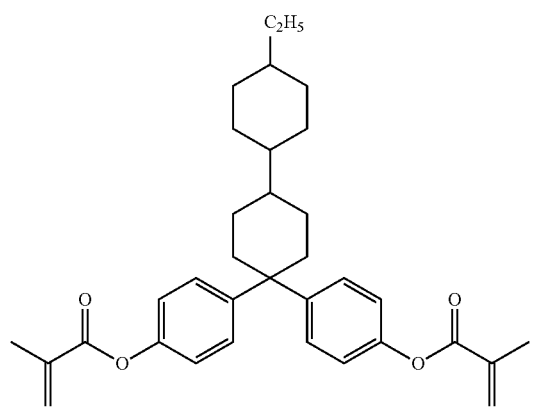
(1-2-2)
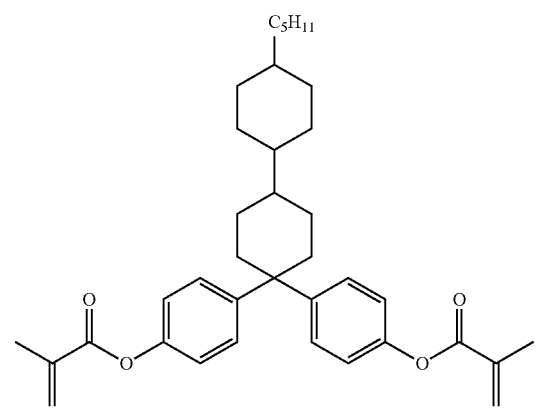
(1-2-3)
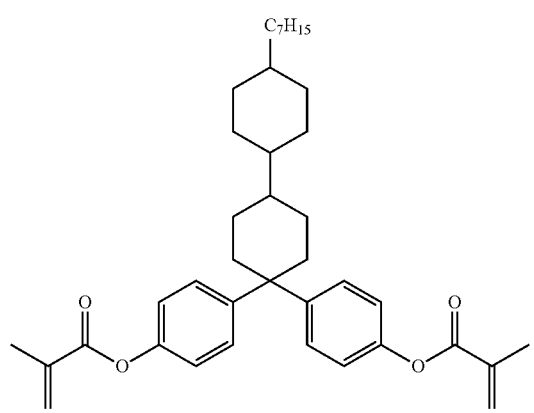
(1-2-4)
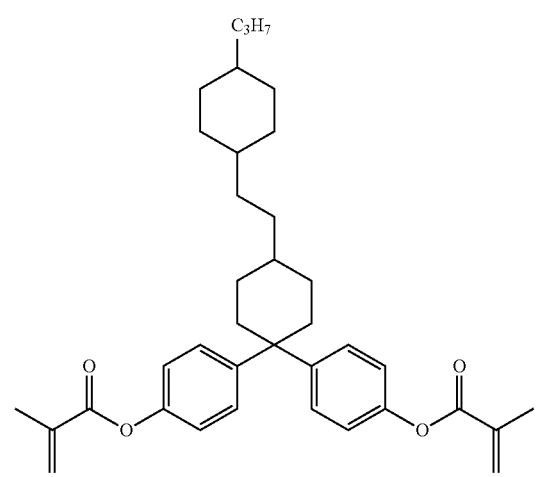

-continued
(1-2-5)
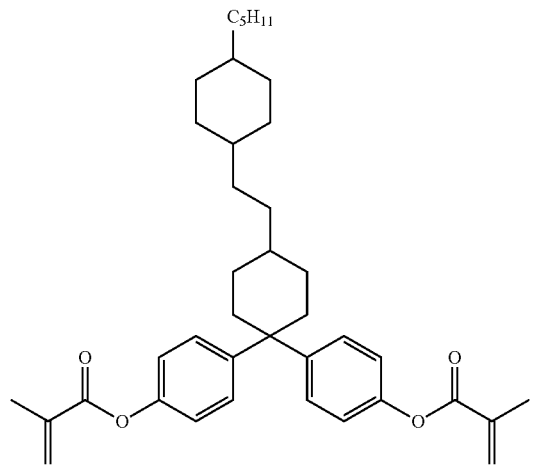
(1-2-6)
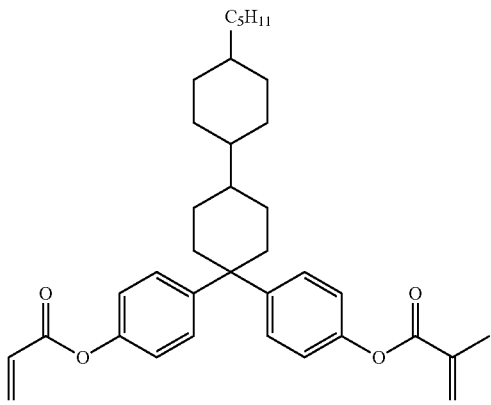
(1-2-7)
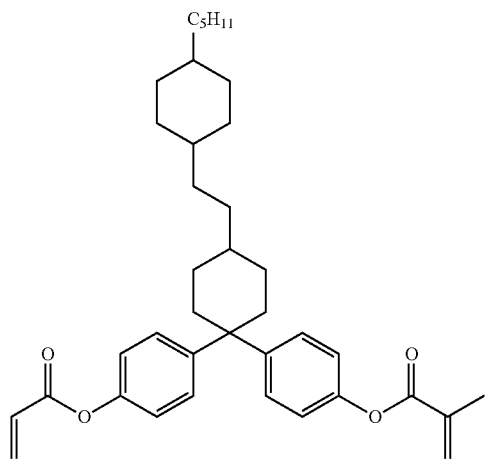
(1-3-1)
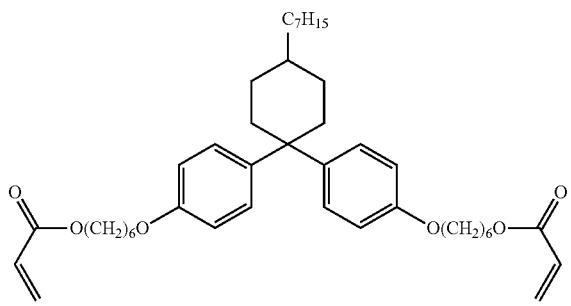
(1-3-2)
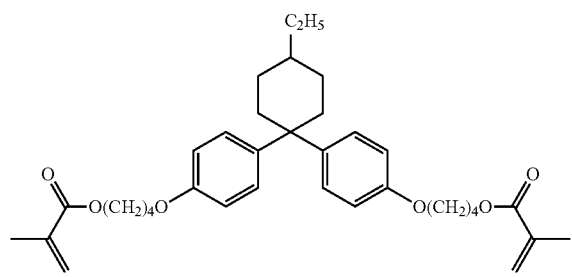
(1-3-3)
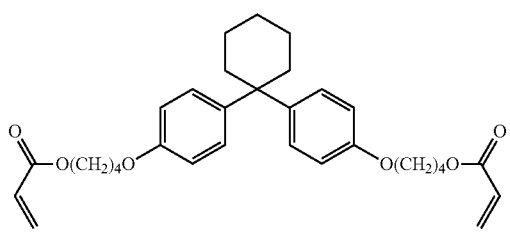
(1-3-4)
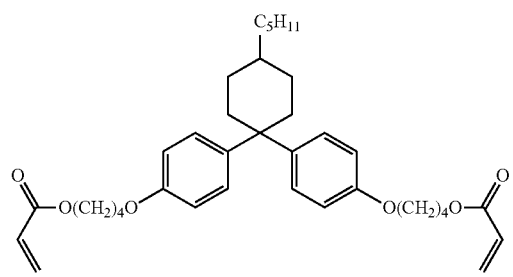
(1-3-5)
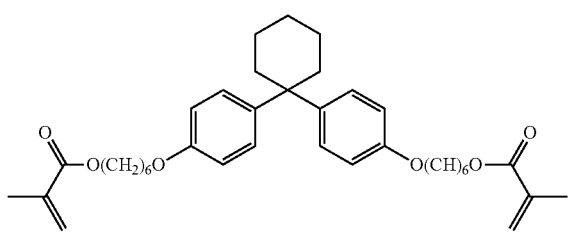

-continued
(1-3-6)
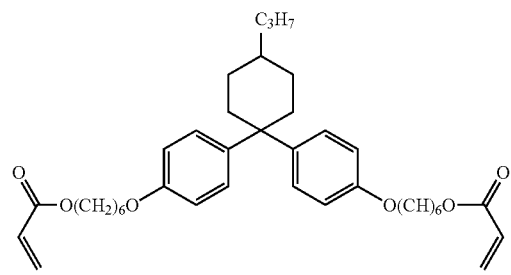
(1-3-7)
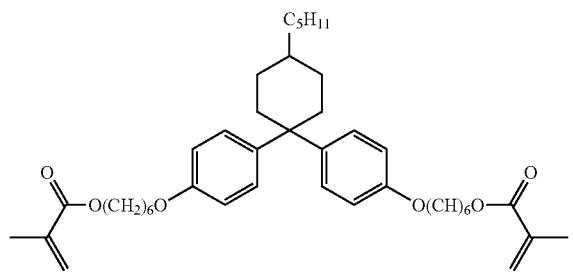
(1-3-8)
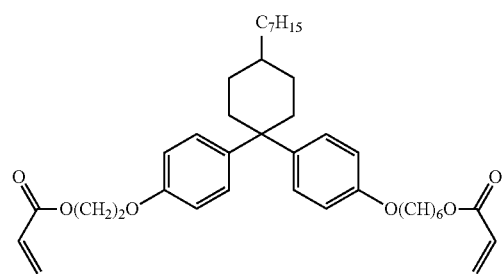
(1-3-9)
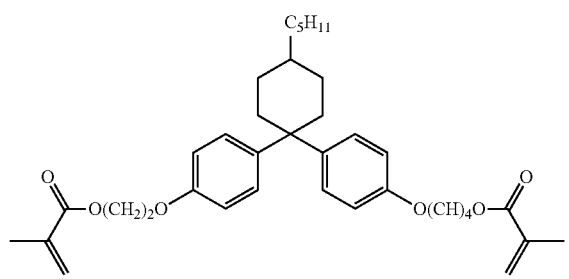
(1-4-1)
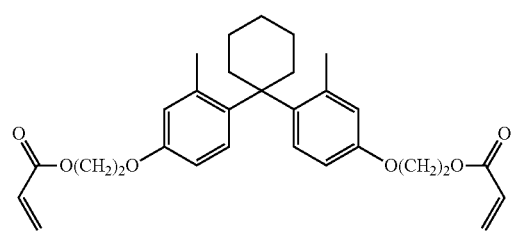
(1-4-2)
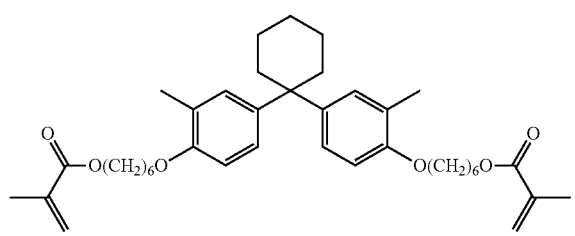
(1-4-3)
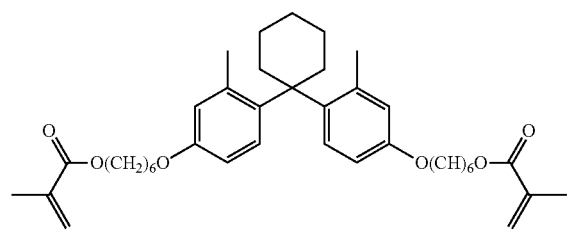
(1-4-4)
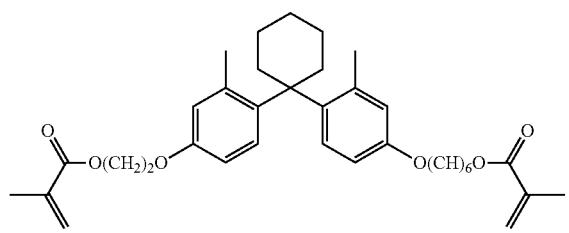
(1-4-5)
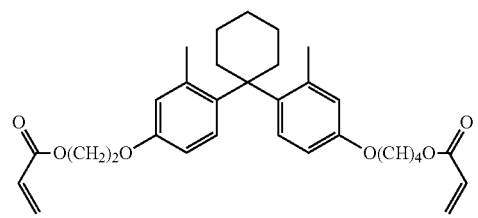
(1-4-6)
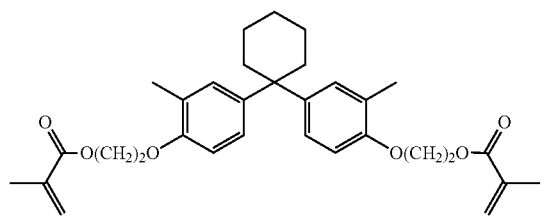

-continued
(1-5-1)
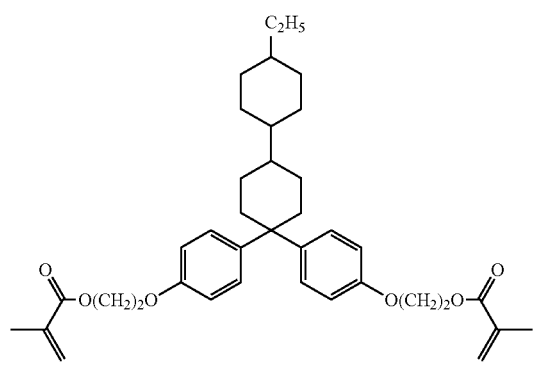
(1-5-2)
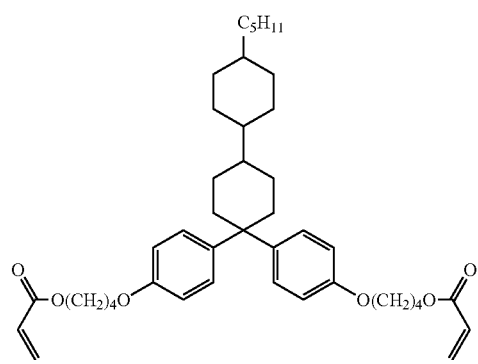
(1-5-3)
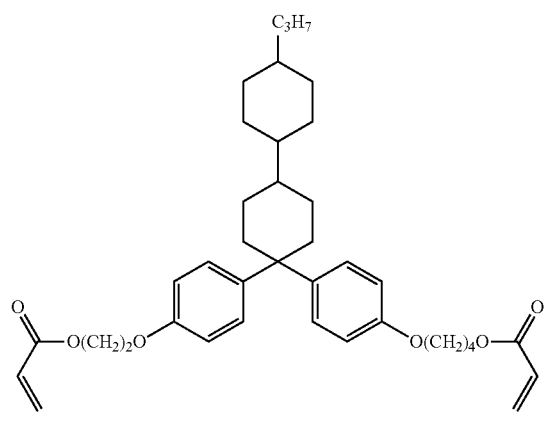
(1-5-4)
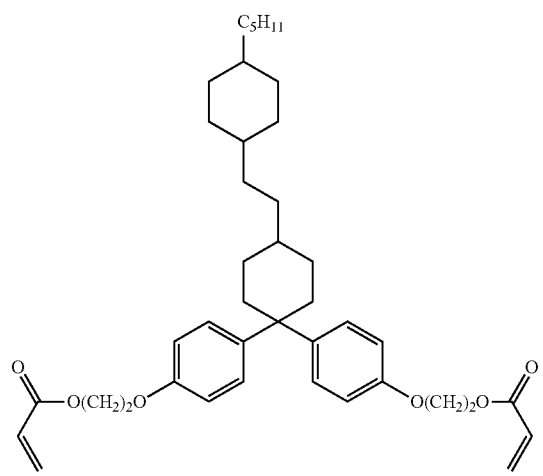
(1-5-5)
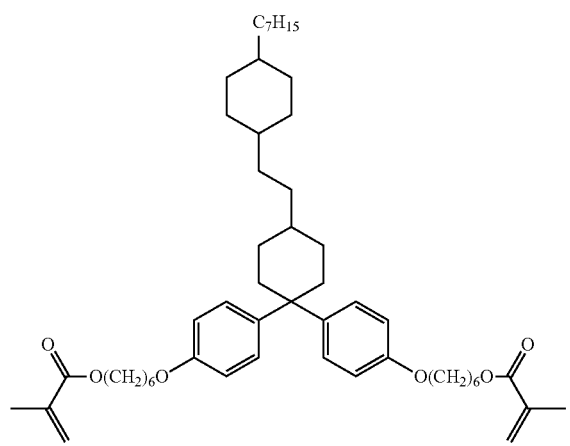
(1-5-6)
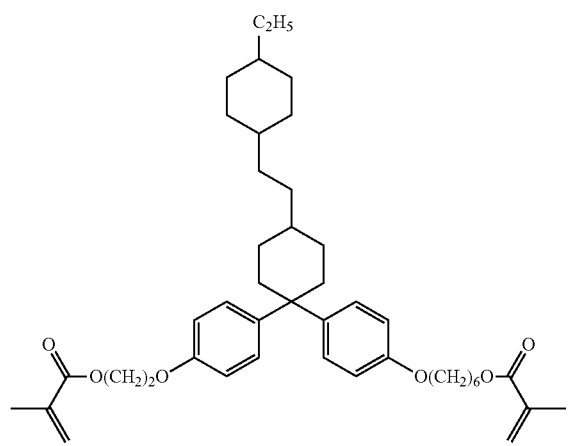
(1-6-1)
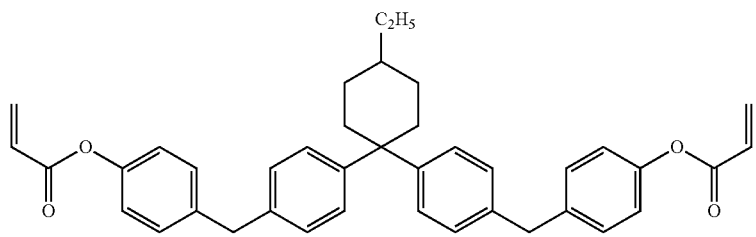

-continued
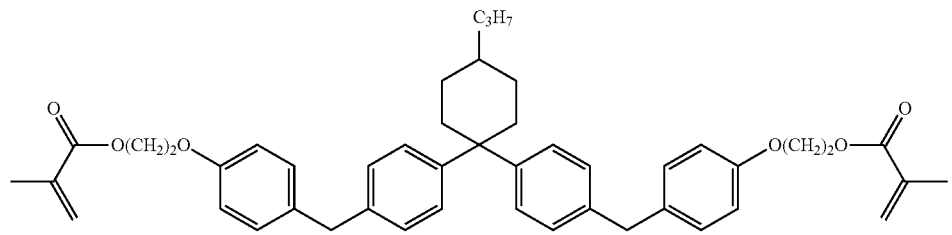
(1-6-2)
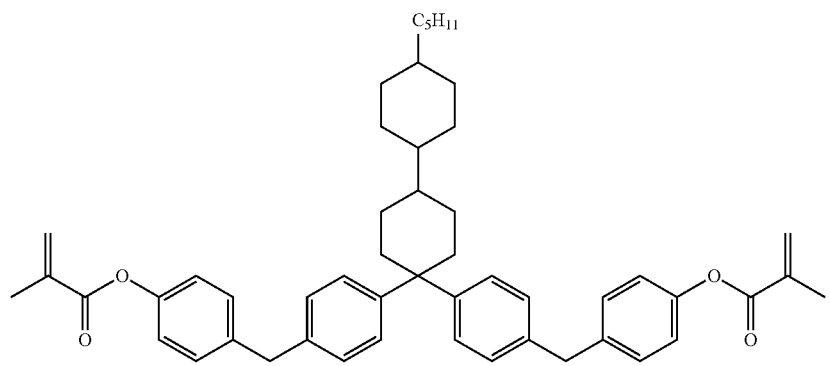
(1-6-3)
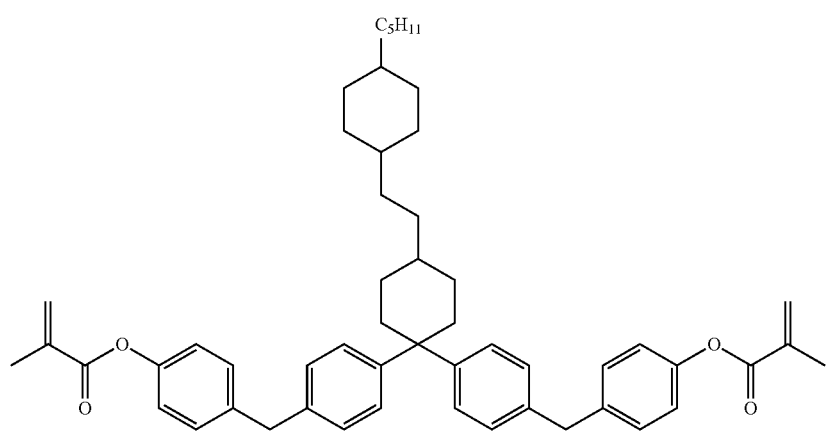
(1-6-4)
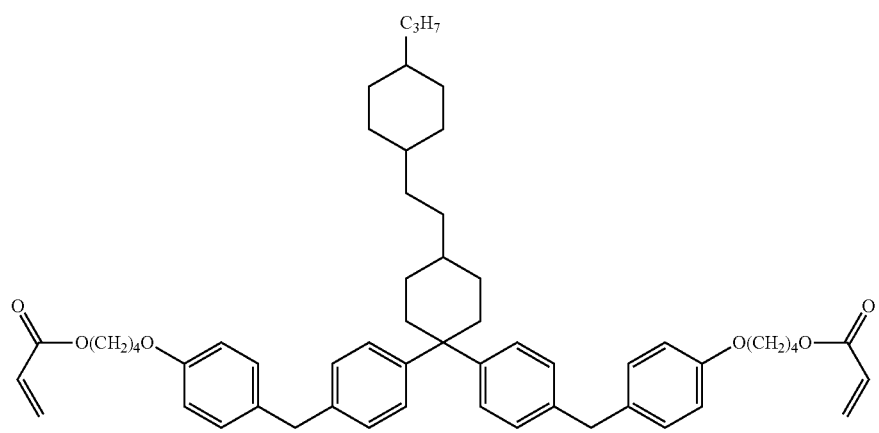
(1-6-5)

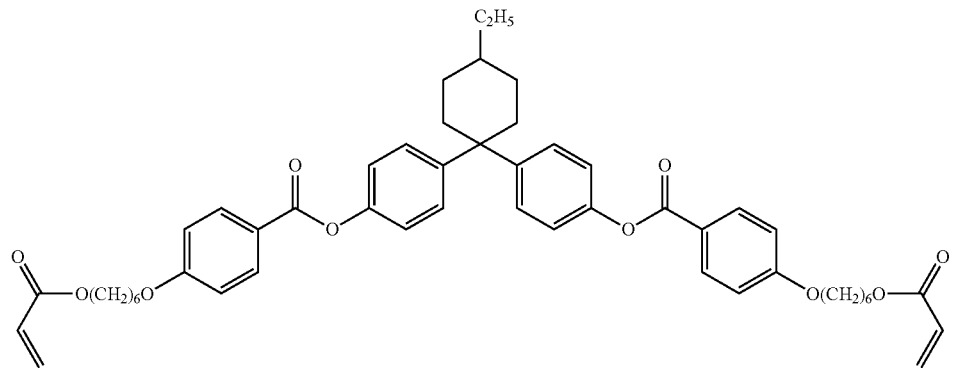
(1-6-6)
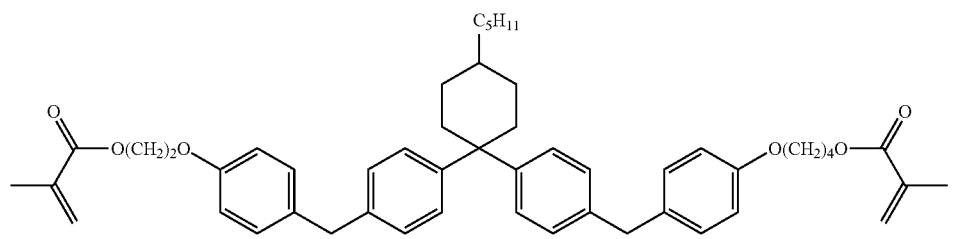
(1-6-7)
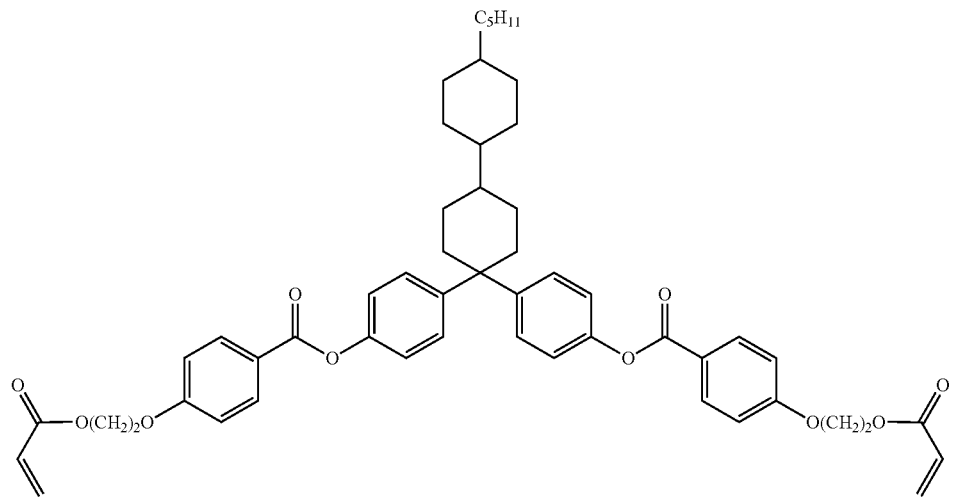
(1-6-8)
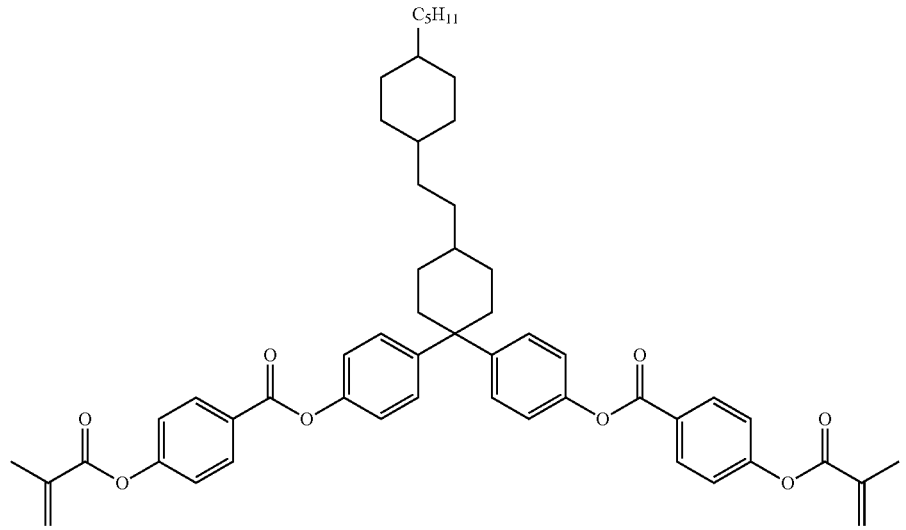
(1-6-9)

(1-6-10)
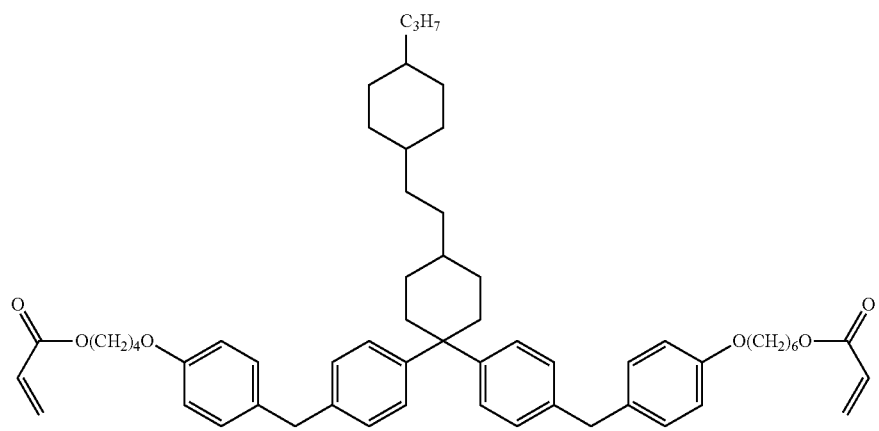
(1-6-11)
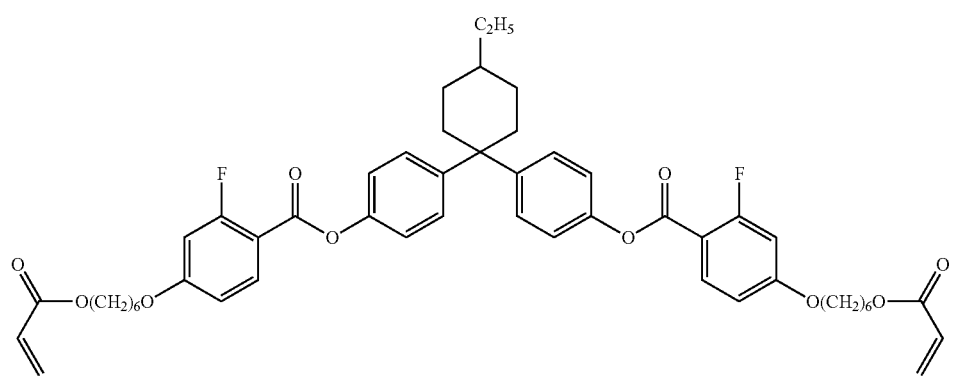
(1-6-12)
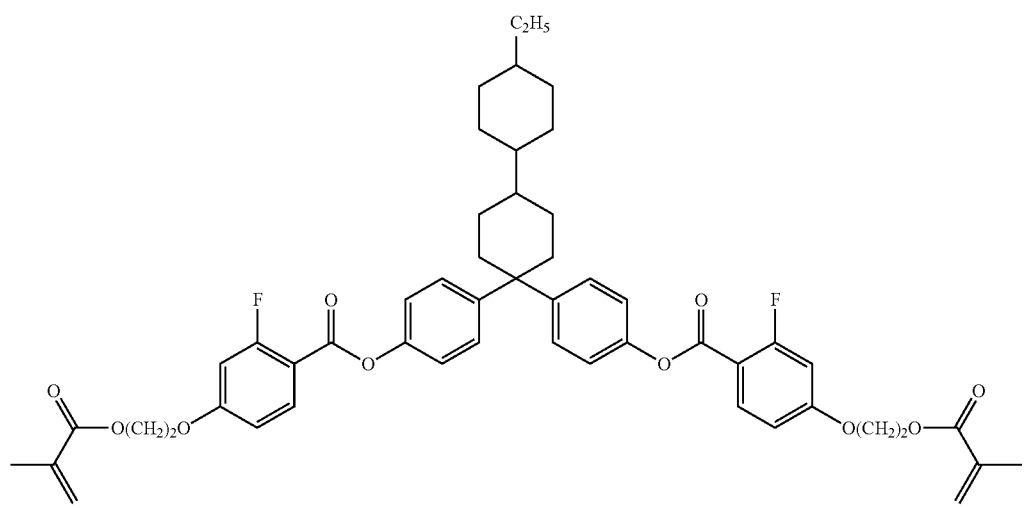

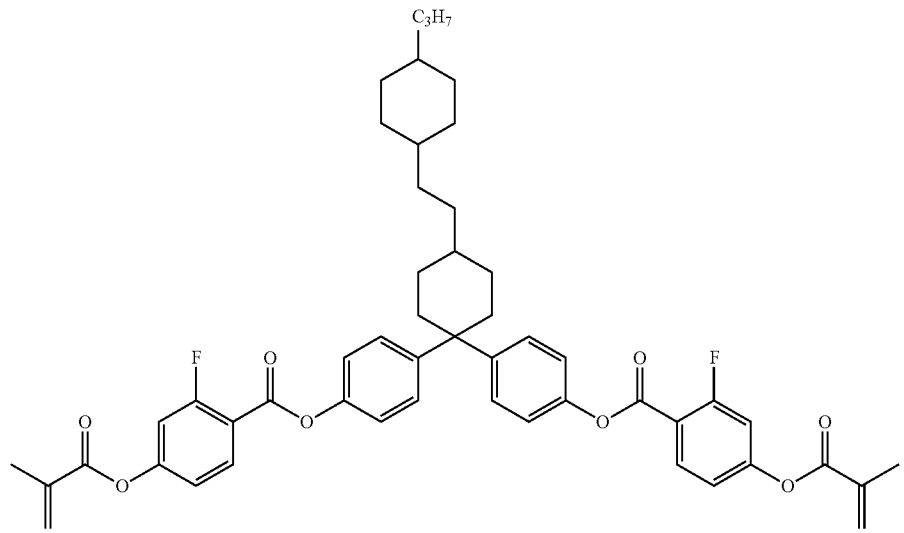
(1-6-13)
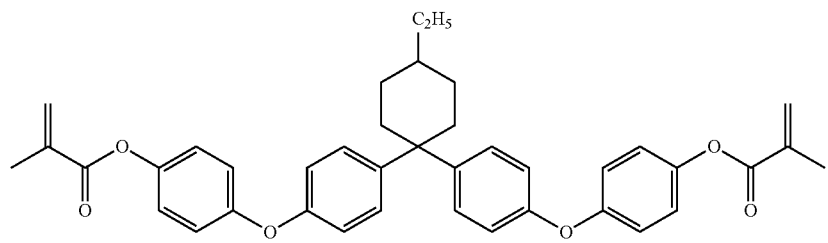
(1-7-1)
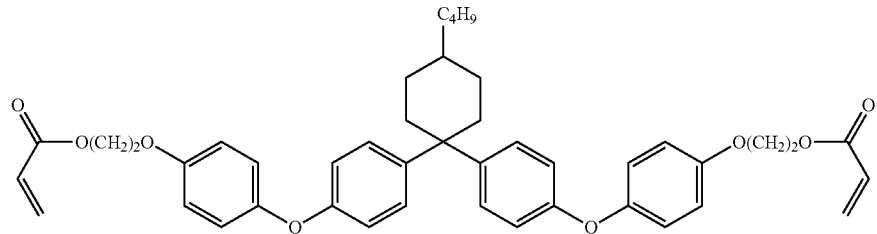
(1-7-2)
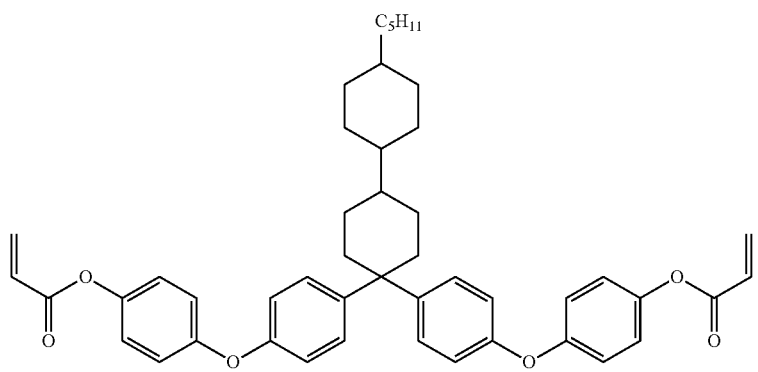
(1-7-3)

(1-7-4)
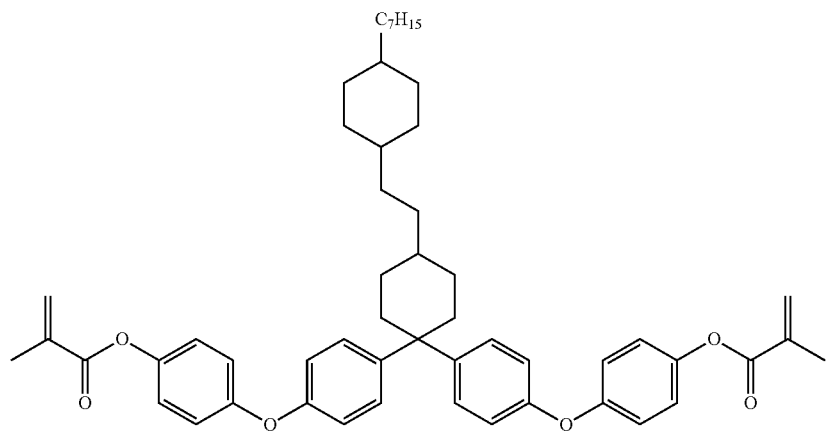
(1-7-5)
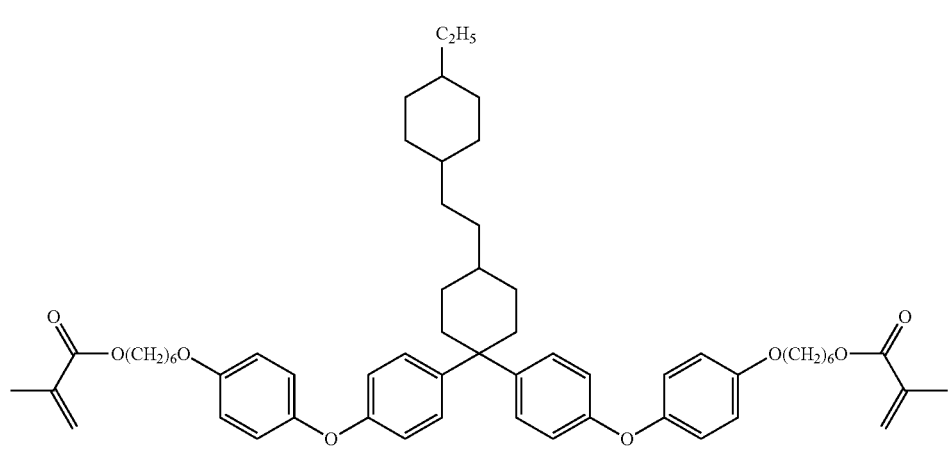
(1-7-6)
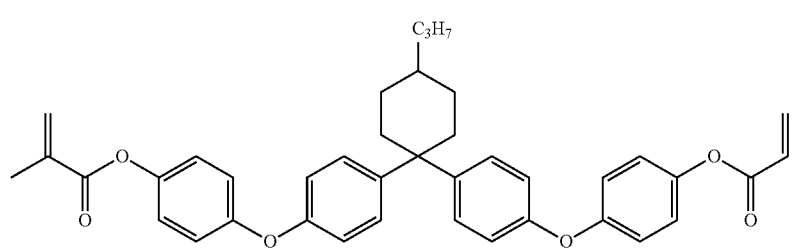
(1-7-7)
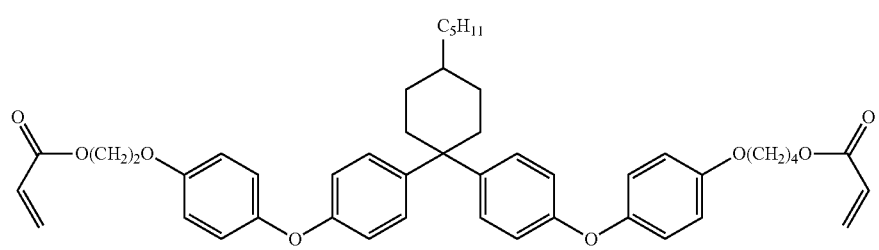

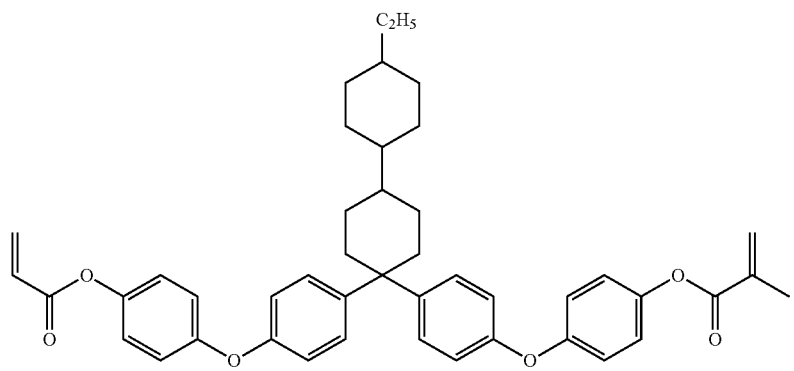

(1-7-8)

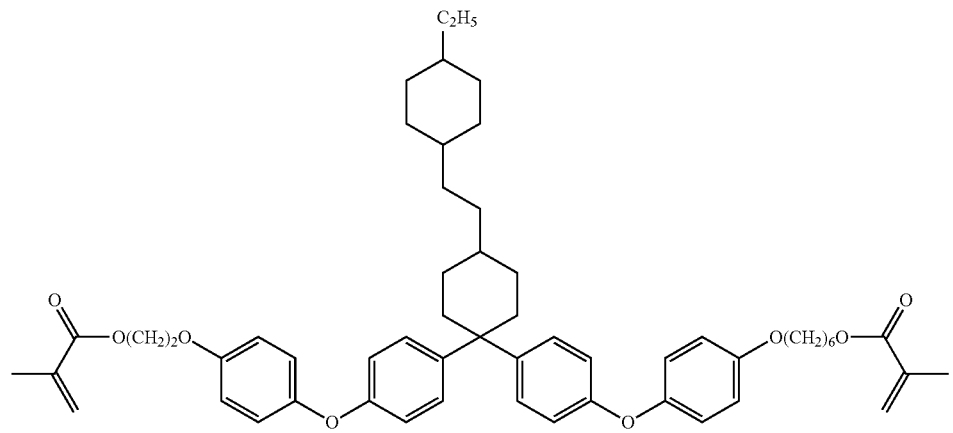

(1-7-9)

The compound of the invention can be used by addition to a non-polymerizable liquid crystal composition having a positive or negative dielectric anisotropy. A preferred liquid crystal composition having a positive dielectric anisotropy is disclosed in JP 3086228 B, JP 2635435 B, JP H5-501735 A, JP H8-157826 A, JP H8-231960 A, JP H9-241644 A (EP 885272 A), JP H9-302346 A (EP 806466 A), JP H8-199168 A (EP 722998 A), JP H9-235552 A, JP H9-255956 A, JP H9-241643 A (EP 885271 A), JP H10-204016 A (EP 844229 A), JP H10-204436 A, JP H10-231482 A, JP 2000-087040 A, JP 2001-48822 A, or the like.

A preferred non-polymerizable liquid crystal composition having a negative dielectric anisotropy is disclosed in JP S57-114532 A, JP H2-4725 A, JP H4-224885 A, JP H8-40953 A, JP H8-104869 A, JP H10-168076 A, JP H10-168453 A, JP H10-236989 A, JP H10-236990 A, JP H10-236992 A, JP H10-236993 A, JP H10-236994 A, JP H10-237000 A, JP H10-237004 A, JP H10-237024 A, JP H10-237035 A, JP H10-237075 A, JP H10-237076 A, JP H10-237448 A (EP 967261 A), JP H10-287874 A, JP H10-287875 A, JP H10-291945 A, JP H11-029581 A, JP H11-080049 A, JP 2000-256307 A, JP 2001-019965 A, JP 2001-072626 A, JP 2001-192657 A, or the like.

The composition can also be used by further adding one kind or more kinds of additives, such as the optically active compound, a polymerization initiator, the antioxidant, the ultraviolet light absorber and the antifoaming agent, to the composition having the positive or negative dielectric anisotropy.

The polymer of the invention is obtained by polymerizing compound (1) or the composition containing compound (1). If only one of compound (1) is polymerized, a homopolymer is obtained. If a composition containing a plurality of polymerizable compounds is polymerized, a copolymer is obtained.

Moreover, in a case where a composition formed by adding compound (1) to the non-polymerizable liquid crystal composition is polymerized, the composition contains a homopolymer in which compound (1) is polymerized in the non-polymerizable liquid crystal composition. The composition described above is also referred to as the polymer.

Polymerization can be carried out by performing irradiation with energy (electromagnetic waves). Such electromagnetic waves include ultraviolet light, infrared light, visible light, X-rays and gamma-rays. Moreover, irradiation may be performed with high energy particles, such as ions and electrons.

Alignment of at least one compound or the composition according to the invention can be immobilized by irradiation with the electromagnetic waves. The wavelength of electromagnetic waves is preferably in the range of 150 to 500 nanometers. The wavelength is further preferably in the range of 250 to 450 nanometers, particularly preferably, in the range of 300 to 400 nanometers. At temperature during irradiation, at least one compound or the composition is in a liquid crystal state. The temperature is preferably 100° C. or lower for preventing thermopolymerization.

Under a state of applying voltage, the polymerizable compound is polymerized by allowing polymerization, or crosslinked in the liquid crystal composition between substrates of the liquid crystal display device in a display device. Specific examples of a polymerization method include thermopolymerization or photopolymerization, preferably, photopolymerization. When necessary, at least one kind of polymerization initiator can also be added hereto. Polymerization conditions and suitable types of polymerization initiators are publicly known to those skilled in the art, and are described in many literatures.

The polymerization group, (meth)acrylate, is suitable for radical polymerization. Polymerization can be carried out more rapidly by adding the polymerization initiator or optimizing a reaction temperature, but the polymerization initiator may or may not be added.

Specific examples of a photoradical polymerization initiator include commercial products including TPO, 1173 and 4265 from Darocure series of Ciba Specialty Chemicals Inc., and 184, 369, 500, 651, 784, 819, 907, 1300, 1700, 1800, 1850 and 2959 from Irgacure series thereof under a specific trade name, but any publicly known photoradical polymerization initiator can also be used.

Other examples of the photoradical polymerization initiator include 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, a benzophenone/Michler's ketone mixture, a hexaarylbiimidazole/mercaptobenzimidazole mixture, 1-(4-isopropylphenyl)-2-hydroxy-2-methyopropane-1-one, benzyl dimethyl ketal, 2-methyl-1-[4-(methylthio)phenyl]-2-morpholinopropane-1-one, a 2,4-diethylxanthone/methyl p-dimethylaminobenzoate mixture, and a benzophenone/methyltriethanolamine mixture, but any publicly known photoradical polymerization initiator can also be used.

The polymerizable compound of the invention is excellent in view of a rapid reaction without particularly using the polymerization initiator. Thus, reduction of a poor display caused by the photoradical polymerization initiator or a residue thereof remaining in the system, and prolongation of a product life cycle can be achieved.

The polymerizable compound of the invention may be used alone or in combination with any other polymerizable compound. Specific examples of polymerizable compounds that can be used in combination therewith include a commercially available monomer or a publicly known monomer, including an existing monofunctional liquid crystal monomer (having one polymerizable group) or polyfunctional liquid crystal monomer (having two or more polymerizable groups) suitable for use in a liquid crystal display device as described in JP 2004-123829 A.

The liquid crystal display device of the invention is a liquid crystal display apparatus having two substrates including transparent electrodes and alignment control films for aligning liquid crystal molecules, and to be manufactured through a process for arranging between the substrates the liquid crystal composition containing the polymerizable compound, polymerizing the polymerizable compound while applying voltage between opposing transparent electrodes of the substrates, and immobilizing the alignment of the liquid crystal molecules.

Examples

In the following, the invention will be explained in greater detail by way of Examples, but the invention is not limited by the Examples. In addition, unless otherwise noted, "%" is expressed in terms of "% by weight." Moreover, a liter representing a volume was expressed using L.

A compound obtained by synthesis was identified by means of proton nuclear magnetic resonance spectroscopy ($^1$H-NMR), high performance liquid chromatography (HPLC) or the like. A melting point of the compound was determined by means of differential scanning calorimetry (DSC). First, each analytical method will be explained.

$^1$H-NMR Analysis: As a measuring apparatus, DRX-500 (made by Bruker BioSpin Corporation) was used. A sample prepared in Examples and so forth was dissolved in a deuterated solvent such as $CDCl_3$ in which the sample was soluble, and measurement was carried out under the conditions of room temperature, 500 MHz, 24 times of accumulation and so forth. In the explanation of nuclear magnetic resonance spectra obtained, s, d, t, q and m stand for a singlet, a doublet, a triplet, a quartet, and a multiplet, respectively. Moreover, tetramethylsilane (TMS) was used as an internal standard for a zero point of chemical shifts ($\delta$).

HPLC Analysis: As a measuring apparatus, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an effluent, acetonitrile and water were suitably mixed and used. As a detector, an UV detector, a RI detector and a CORONA detector or the like was suitably used. When the UV detector was used, a detection wavelength was set at 254 nanometers.

A sample was dissolved in acetonitrile to prepare a solution of 0.1%, and 1 microliter of the solution obtained was introduced into a sample injector. As a recorder, C-R7Aplus made by Shimadzu Corporation was used. The chromatogram obtained shows a retention time of a peak and a value of each peak area corresponding to each component compound.

A ratio of peak areas in the chromatogram obtained from HPLC corresponds to a ratio of component compounds. In general, the weight percent of each component compound in an analytical sample is not completely identical with the percentage of each peak area in the analytical sample. When the columns described above are used in the invention, however, the weight percent of each component compound in the analytical sample corresponds substantially to the percentage of each peak area in the analytical sample because a correction coefficient is essentially 1 (one). The reason is that no significant difference exists among the correction coefficients of the component compounds. In order to more accurately determine a composition ratio of the liquid crystal compounds in the liquid crystal composition by the chromatogram, an internal standard method by the chromatogram is applied. Each component (test-component) of the liquid crystal compounds and a liquid crystal compound as a standard (standard reference material) as weighed accurately in a fixed amount are simultaneously analyzed by means of HPLC, and relative intensity is calculated in advance relative to a ratio of a peak area of the test-component to a peak area of the standard reference material. When corrected using the relative intensity of the peak area of each component to the peak area of the standard reference material, the composition ratio of the liquid crystal compounds in the liquid crystal composition can be more accurately determined from the chromatogram.

DSC Measurement: A differential scanning calorimeter, DSC-7 System or Diamond DSC System, made by PerkinElmer, Inc. was used. A sample was heated and then cooled at a rate of 3° C. per minute. A starting point (on set) of an endothermic peak or an exothermic peak caused by a phase change of the sample was determined by extrapolation, and thus a melting point was determined.

Response Time ($\tau$; measured at 25° C.; ms): An LCD-5100 luminance meter made by Otsuka Electronics Co., Ltd. was used for measurement. A light source was a halogen lamp. A low-pass filter was set at 5 kHz. A sample was put in a normally black mode PVA device in which a distance (cell gap) between two glass substrates was 3.2 micrometers and a rubbing direction was anti-parallel, and the device was sealed with an ultraviolet-curable adhesive. A voltage a little over a threshold voltage was applied to the device for about 1 minute, and then the device was irradiated with ultraviolet light of 23.5 mW/cm$^2$ using an ultra-high pressure mercury lamp (EXECURE 3000 made by HOYA CANDEO OPTRONICS CORPORATION, 250 W) for about 8 minutes while applying a voltage of 5.6 V. Rectangular waves (60 Hz, 10 V, 0.5 second) were applied to the device. On the occasion, the device was irradiated with light from a direction perpendicular to the device, and the amount of light transmitting the device was measured. The maximum amount of light corresponds to 100% transmittance, and the minimum amount of light corresponds to 0% transmittance. A response time is a period of time rise time needed for a change from 0% transmittance to 90% transmittance (rise time; millisecond).

Example 1

Synthesis of Compound (1-2-2)

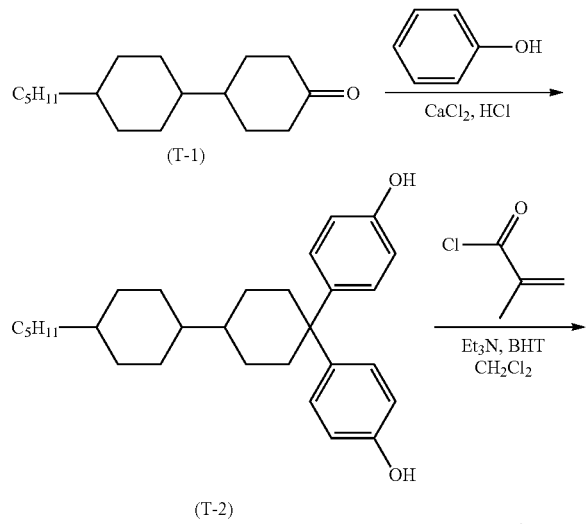

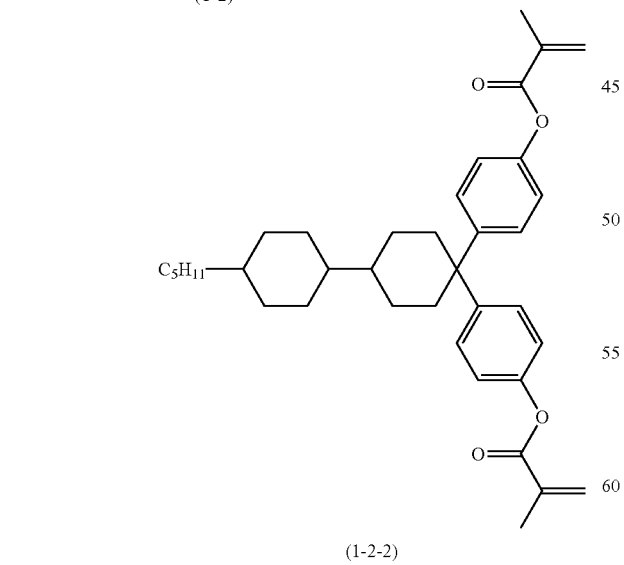

First Step: Synthesis of Compound (T-2)

Calcium chloride (29 g) was added to a mixture of compound (T-1) (50 g) and phenol (75 g) at room temperature. Hydrochloric acid (30 mL) (Cica extra pure grade, made by Kanto Chemical Co., Inc.) was added dropwise thereto, and the resultant reaction solution was stirred. The reaction solution solidified gradually. After 16 hours, hot water and ethyl acetate were added and an organic layer was extracted, and the organic layer was sequentially washed with a saturated aqueous solution of sodium hydrogencarbonate, and water. After the resultant organic layer was dried over anhydrous magnesium sulfate, an organic solvent was distilled off under reduced pressure. A residue was subjected to recrystallization using toluene, and compound (T-2) was obtained as a colorless crystal (55 g).

Second Step: Synthesis of Compound (1-2-2)

Under a nitrogen atmosphere, methacrylic acid chloride (6.5 g) was added dropwise to a mixture of dichloromethane (150 mL), compound (T-2) (10 g), triethylamine (6.3 g) and 2,6-di-tert-butyl-p-cresol (5.2 mg) under ice-cooling, and temperature was gradually increased to room temperature. Stirring was carried out at room temperature for 16 hours, and then the resultant reaction mixture was poured into water, and an organic layer was sequentially washed with 1 M hydrochloric acid, a 1 M sodium hydroxide aqueous solution, and water. After the resultant organic layer was dried over anhydrous magnesium sulfate, an organic solvent was distilled off under reduced pressure and a residue was purified by means of silica gel column chromatography (eluent:toluene). Crude crystals were subjected to recrystallization from a mixed solvent of dichloromethane and ethanol, and thus compound (1-2-2) was obtained as a colorless crystal (6.8 g).

Melting point: 142° C.

$^1$H-NMR (CDCl$_3$; δ ppm): 7.36 (d, 2H), 7.17 (d, 2H), 7.08 (d, 2H), 6.95 (d, 2H), 6.33 (s, 1H), 6.30 (s, 1H), 5.74 (t, 1H), 5.71 (t, 1H), 2.66 (s, 1H), 2.63 (s, 1H), 2.06 (s, 3H), 2.03 (s, 3H), 1.93-1.88 (m, 2H), 1.71-1.66 (m, 6H), 1.31-1.09 (m, 13H), 0.92-0.74 (m, 4H), 0.87 (t, 3H).

Example 2

Synthesis of Compound (1-1-1)

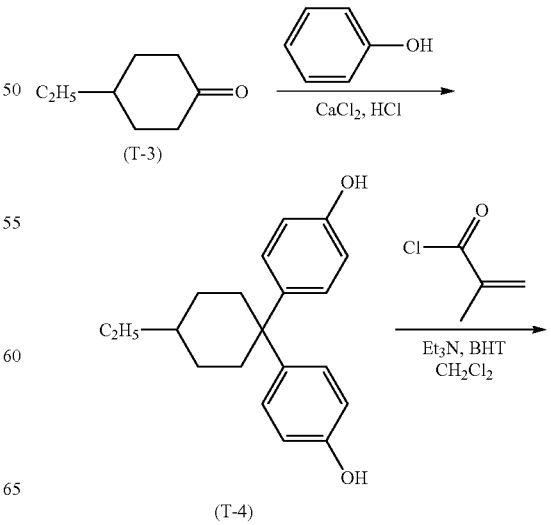

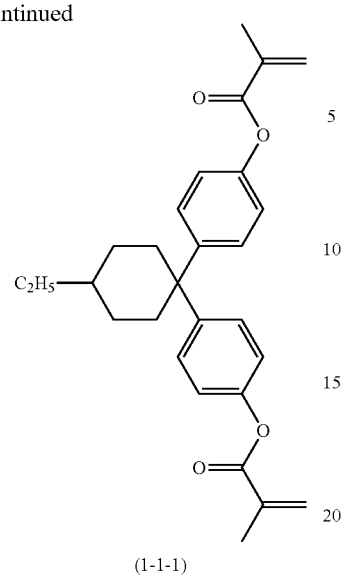

(1-1-1)

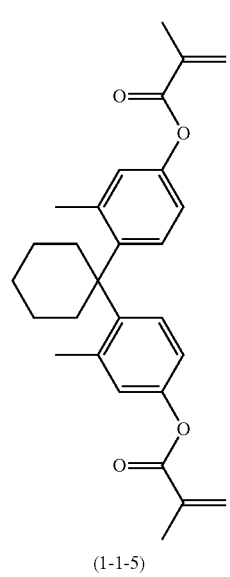

(1-1-5)

First Step: Synthesis of Compound (T-1)

Compound (T-4) was obtained as a colorless crystal by performing synthesis in a manner similar to First step in Example 1 except that compound (T-3) was used in place of compound (T-1).

Second Step: Synthesis of Compound (1-1-1)

Compound (1-1-1) was obtained as a colorless crystal by performing synthesis in a manner similar to Second step in Example 1 except that compound (T-4) was used in place of compound (T-2).

Melting point: 79° C.

$^1$H-NMR (CDCl$_3$; δ ppm): 7.36 (d, 2H), 7.18 (d, 2H), 7.08 (d, 2H), 6.96 (d, 2H), 6.33 (s, 1H), 6.30 (s, 1H), 5.74 (t, 1H), 5.71 (t, 1H), 2.64 (s, 1H), 2.61 (s, 1H), 2.06 (s, 3H), 2.03 (s, 3H), 1.97-1.91 (m, 2H), 1.73-1.70 (m, 2H), 1.30-1.24 (m, 1H), 1.19-1.07 (m, 4H), 0.84 (t, 3H).

Example 3

Synthesis of Compound (1-1-5)

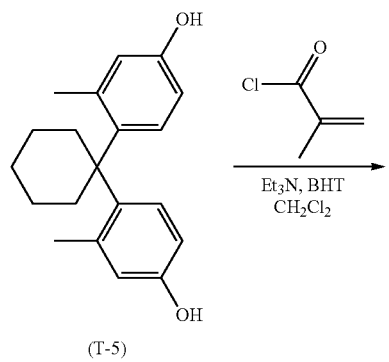

(T-5)

Compound (1-1-5) was obtained as a colorless crystal by performing synthesis in a manner similar to Second step in Example 1 except that compound (T-5) was used in place of compound (T-2).

Melting point: 107° C.

$^1$H-NMR (CDCl$_3$; δ ppm): 7.11-7.09 (m, 4H), 6.95 (d, 2H), 6.34 (s, 2H), 5.73 (t, 2H), 2.24 (t, 4H), 2.14 (s, 6H), 2.06 (s, 6H), 1.58-1.52 (m, 4H), 1.50-1.46 (m, 2H).

Example 4

Synthesis of Compound (1-2-5)

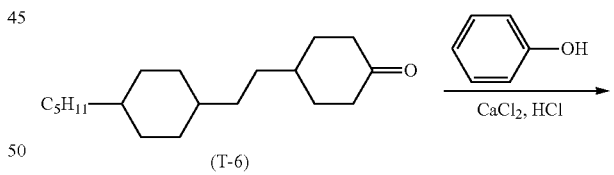

(T-6)

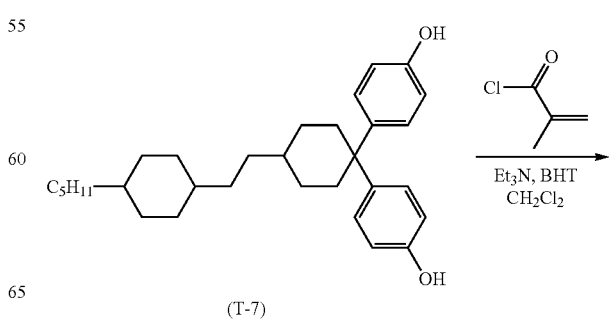

(T-7)

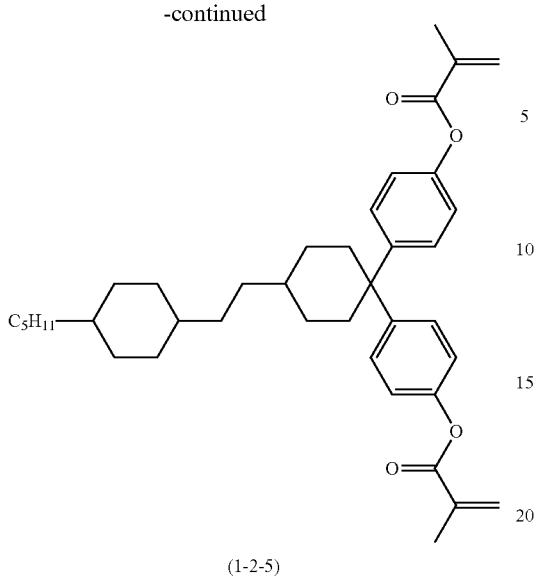

(1-2-5)

First Step: Synthesis of Compound (T-7)

Compound (T-7) was obtained as a colorless crystal by performing synthesis in a manner similar to First step in Example 1 except that compound (T-6) was used in place of compound (T-1).

Second Step: Synthesis of Compound (1-2-5)

Compound (1-2-5) was obtained as a colorless crystal by performing synthesis in a manner similar to Second step in Example 1 except that compound (T-7) was used in place of compound (T-2).

Melting point: 130° C.

$^1$H-NMR (CDCl$_3$; δ ppm): 7.36 (d, 2H), 7.17 (d, 2H), 7.08 (d, 2H), 6.95 (d, 2H), 6.33 (s, 1H), 6.30 (s, 1H), 5.74 (t, 1H), 5.72 (t, 1H), 2.63 (s, 1H), 2.60 (s, 1H), 2.06 (s, 3H), 2.03 (s, 3H), 1.96-1.91 (m, 2H), 1.73-1.67 (m, 6H), 1.32-1.18 (m, 7H), 1.15-1.06 (m, 10H), 0.87 (t, 3H), 0.84-0.80 (m, 4H).

Example 5

Synthesis of Compound (1-4-1)

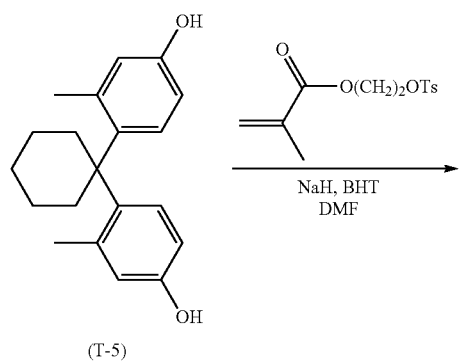

(T-5)

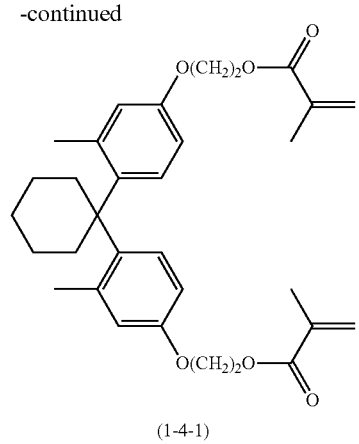

(1-4-1)

Sodium hydride (2.2 g) (Organics, made by Kanto Chemical Co., Inc.) was added to a N,N-dimethylformamide (80 mL) solution of compound (T-5) (5.0 g), and the resultant solution was heated and stirred at 60° C. for 1 hour. Next, 2-tosyloxyethyl methacrylate (11.5 g), 2,6-di-tert-butyl-p-cresol (3.7 mg) and N,N-dimethylformamide (80 mL) were added, and the resultant solution was heated and stirred at 60° C. for 4 hours. After the reaction solution was allowed to cool to room temperature, water was poured thereinto. An organic layer was extracted with toluene and washed with saturated brine. After the resultant organic layer was dried over anhydrous magnesium sulfate, an organic solvent was distilled off under reduced pressure, a residue was purified by means of silica gel column chromatography (eluent:toluene:ethyl acetate=9:1), and compound (1-4-1) was obtained as a colorless oily matter (3.5 g).

$^1$H-NMR (CDCl$_3$; δ ppm): 7.05-7.00 (m, 4H), 6.71 (d, 2H), 6.11 (s, 2H), 5.56 (t, 2H), 4.48 (t, 4H), 4.17 (t, 4H), 2.21-2.19 (m, 4H), 2.17 (s, 6H), 1.94 (s, 6H), 1.54-1.46 (m, 4H).

Example 6

Synthesis of Compound (1-5-2)

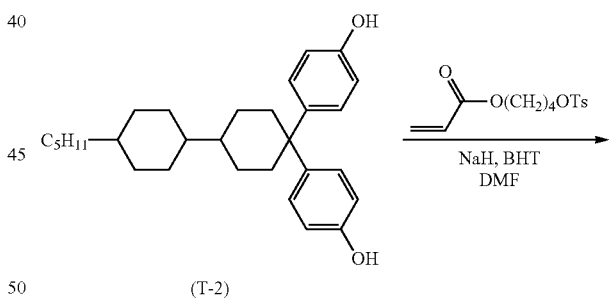

(T-2)

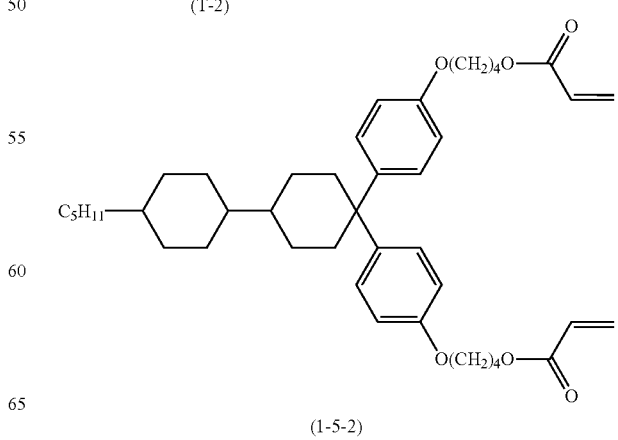

(1-5-2)

Compound (1-5-2) was obtained as a colorless crystal by performing synthesis in a manner similar to the method described in Example 5 except that compound (T-2) was used in place of compound (T-5), and by performing recrystallization of crude crystals from a mixed solvent of dichloromethane and ethanol.

Melting point: 59° C.

$^1$H-NMR (CDCl$_3$; δ ppm): 7.23 (d, 2H), 7.05 (d, 2H), 6.82 (d, 2H), 6.72 (d, 2H), 6.42-6.37 (m, 2H), 6.15-6.07 (m, 2H), 5.83-5.80 (m, 2H), 4.24 (t, 2H), 4.20 (t, 2H), 3.97 (t, 2H), 3.92 (t, 2H), 2.61 (s, 1H), 2.58 (s, 1H), 1.88-1.82 (m, 10H), 1.71-1.66 (m, 6H), 1.31-1.09 (m, 13H), 0.93-0.73 (m, 4H), 0.87 (t, 3H).

Example 7

Synthesis of Compound (1-6-6)

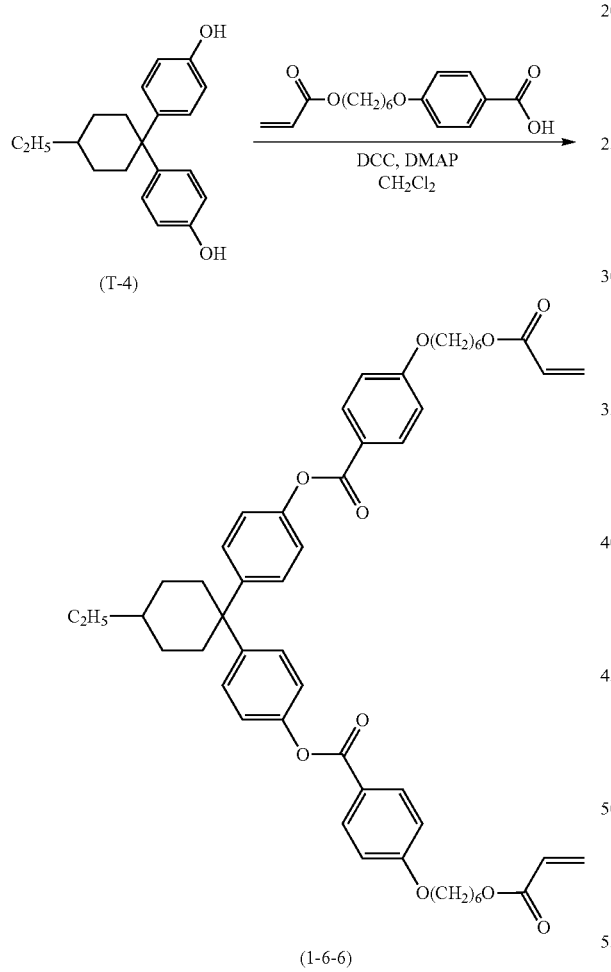

(1-6-6)

Synthesis of Compound (1-6-6)

Under a nitrogen atmosphere, a dichloromethane (50 mL) solution of 1,3-dicyclohexylcarbodiimide (3.1 g) was added dropwise to a mixture of dichloromethane (150 mL), compound (T-4) (2.0 g), 4-((6-(acryloyloxy)hexyl)oxy)benzoic acid (4.3 g), 4-dimethylaminopyridine (0.082 g) and 2,6-di-tert-butyl-p-cresol (3.0 mg) under ice-cooling, and temperature was gradually increased to room temperature. Stirring was carried out at room temperature for 16 hours. The resultant reaction solution was washed with water, the resultant organic layer was dried over anhydrous magnesium sulfate, and then an organic solvent was distilled off under reduced pressure. A residue was purified by means of silica gel column chromatography (eluent: a mixed solvent of toluene:ethyl acetate=9:1), and thus compound (1-6-6) was obtained as a colorless oily matter (4.9 g).

$^1$H-NMR (CDCl$_3$; δ ppm): 8.14-8.10 (m, 4H), 7.41 (d, 2H), 7.27-7.15 (m, 4H), 7.05 (d, 2H), 6.97 (t, 4H), 6.42-6.39 (m, 2H), 6.15-6.10 (m, 2H), 5.84-5.81 (m, 2H), 4.18 (t, 2H), 4.18 (t, 2H), 4.05 (t, 2H), 4.04 (t, 2H), 2.68 (s, 1H), 2.65 (s, 1H), 1.20-1.94 (m, 2H), 1.87-1.81 (m, 4H), 1.76-1.69 (m, 6H), 1.56-1.45 (m, 8H), 1.34-1.25 (m, 1H), 1.20-1.10 (m, 4H), 0.85 (t, 3H).

Example 8

Synthesis of Compound (1-3-2)

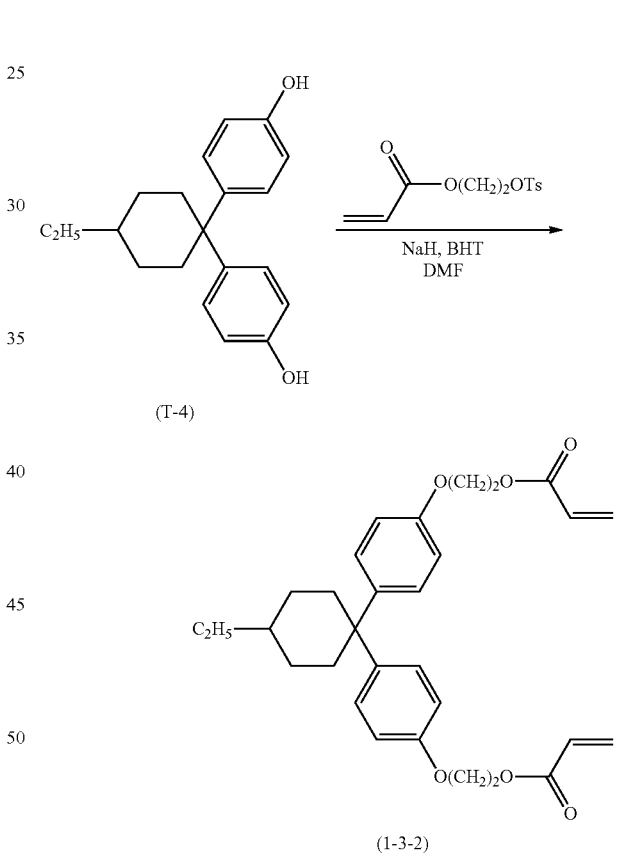

(1-3-2)

Compound (1-3-2) was obtained as a colorless oily matter by performing synthesis in a manner similar to the method described in Example 5 except that compound (T-4) was used in place of compound (T-5).

$^1$H-NMR (CDCl$_3$; δ ppm): 7.25 (d, 2H), 7.08 (d, 2H), 6.86 (d, 2H), 6.76 (d, 2H), 6.46-6.39 (m, 2H), 6.18-6.10 (m, 2H), 5.86-5.82 (m, 2H), 4.50 (t, 2H), 4.46 (t, 2H), 4.20 (t, 2H), 4.14 (t, 2H), 2.60 (s, 1H), 2.57 (s, 1H), 1.92-1.86 (m, 2H), 1.71-1.68 (m, 2H), 1.31-1.22 (m, 1H), 1.17-1.04 (m, 4H), 0.83 (t, 3H).

Comparative Example 1

Synthesis of 4,4'-bis(methacryloyloxy)biphenyl (R-1)

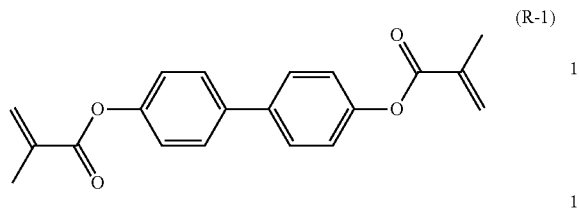

Then, 4,4'-bis(methacryloyloxy)biphenyl (R-1) was obtained as a colorless crystal by performing synthesis in a manner similar to Second step in Example 1 except that 4,4'-dihydroxybiphenyl was used in place of compound (T-2).
Melting point: 153° C.
$^1$H-NMR (CDCl$_3$; δ ppm): 7.58 (d, 4H), 7.20 (d, 4H), 6.38 (s, 2H), 5.78 (t, 2H), 2.09 (s, 6H).

Comparative Example 2

Synthesis of 1,1'-bis(4-methacryloyloxyphenyl)cyclohexane (R-2)

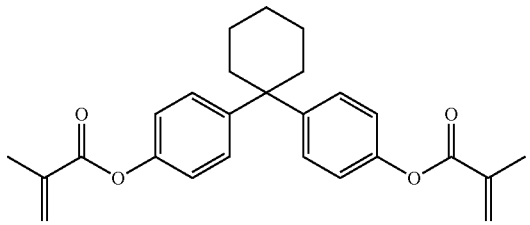 [SMILES: C=C(C)C(=O)Oc1ccc(C2(c3ccc(OC(=O)C(=C)C)cc3)CCCCC2)cc1]

Then, 1,1'-bis(4-methacryloyloxyphenyl)cyclohexane (R-2) was obtained as a colorless crystal by performing synthesis in a manner similar to Second step in Example 1 except that 1,1'-bis(4-hydroxyphenyl)cyclohexane was used in place of compound (T-2).
Melting point: 109° C.
$^1$H-NMR (CDCl$_3$; δ ppm): 7.28 (d, 4H), 7.03 (d, 4H), 6.32 (s, 2H), 5.74 (t, 2H), 2.27 (t, 4H), 2.05 (s, 6H), 1.59-1.50 (m, 6H).

Example 9

Comparison of Solubility in a Liquid Crystal Composition

Then, 0.3% of each of polymerizable compound (1-2-2) according to the invention and polymerizable compound (R-1) according to Comparative Example 1 was added to liquid crystal composition A, and the resultant mixture was heated at 50° C. for 30 minutes. The liquid crystal compositions in which the polymerizable compounds were dissolved, respectively, were allowed to stand (1) for 2 days at room temperature and (2) for 10 days at −20° C. Then, precipitation of crystals was confirmed by visual observation. The results are shown in Table 1. In expressions in Table 1, "good" stands for no finding of crystals, and "bad" stands for finding of crystals.

Components of liquid crystal composition A are as described below.

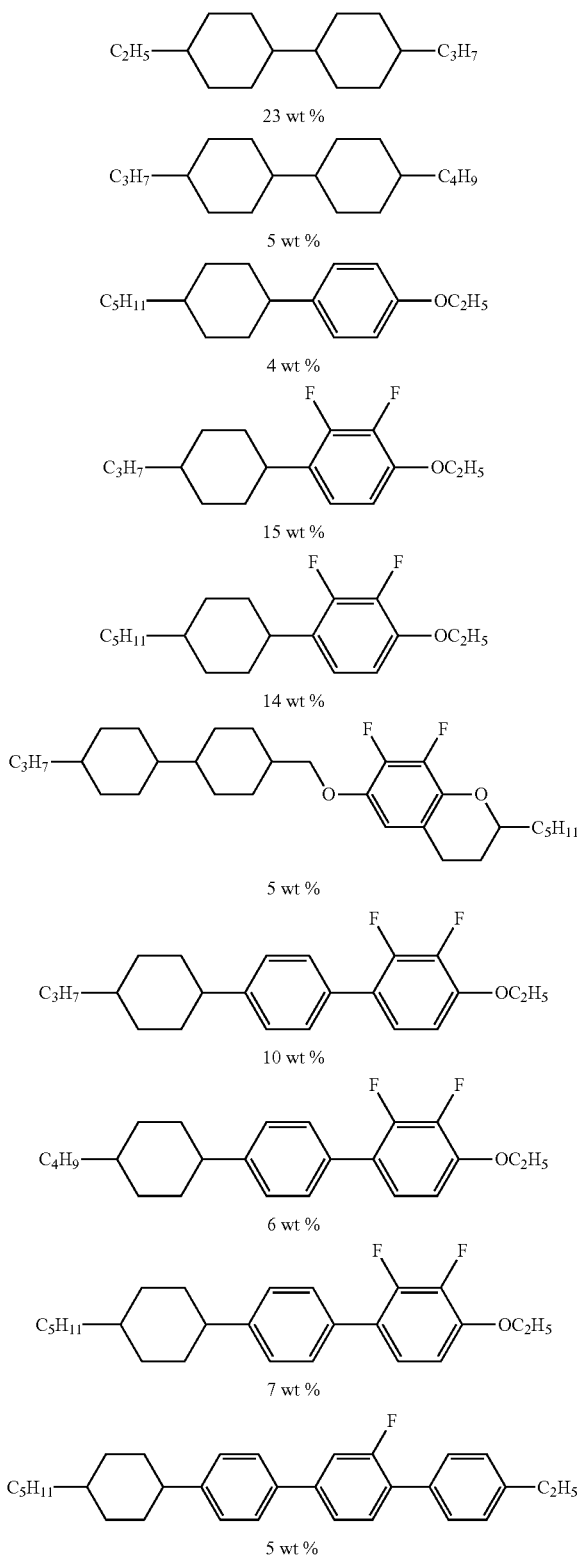

-continued

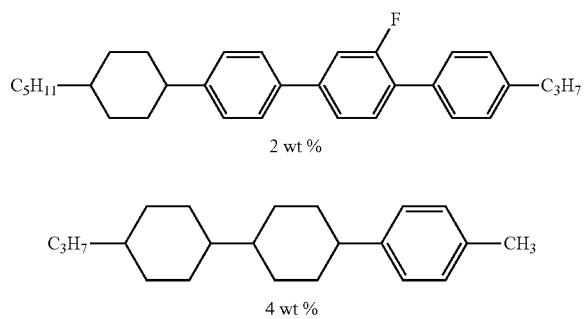

2 wt %

4 wt %

The polymerizable compound according to the invention was found to have a good solubility in liquid crystal composition A.

Example 10

Comparison of Response Time

When 0.3% of polymerizable compound (1-2-2) according to the invention was added to liquid crystal composition A, and a response time was measured in the PVA device described in the invention, the response time (τ) was 5.4 ms.

Comparative Example 3

When a response time of liquid crystal composition A was measured in the PVA device described in the invention, the response time (τ) 7.3 ms.

According to Example 10 and Comparative Example 3, the liquid crystal composition to which the polymerizable compound of the invention was added showed a shorter response time, as compared with the liquid crystal composition to which the polymerizable compound was not added. Therefore, the liquid crystal composition containing the polymerizable compound of the invention was found to be preferably applicable also as a liquid crystal display device utilizing the PSA mode.

TABLE 1

| Formula No. | Structural Formula | Solubility (1) (2 days at room temperature) | Solubility (2) (10 days at −20° C.) |
|---|---|---|---|
| (1-2-2) | $C_5H_{11}$ — [structure with cyclohexyl, diphenyl, and two methacrylate groups] | good | good |
| Comparative Example (R-1) | [structure with biphenyl and two methacrylate groups] | bad | bad |
| Comparative Example (R-2) | [structure with cyclohexyl diphenyl and two methacrylate groups] | bad | bad |

INDUSTRIAL APPLICABILITY

The invention concerns a polymerizable compound having a high solubility in a liquid crystal composition, and having a cyclohexyldiphenyl skeleton laterally having a ring structure or a ring structure with a side chain, a composition containing the compound, a polymer obtained from the composition, and an application thereof. The liquid crystal composition containing the polymerizable compound of the invention is suitable for use in a liquid crystal display device to which a PSA technology is applied. A liquid crystal display device including such a composition has a short response time and an improved degree of image sticking, and therefore can be used for a liquid crystal projector, a liquid crystal television and so forth.

What is claimed is:

1. A compound represented by formula (1):

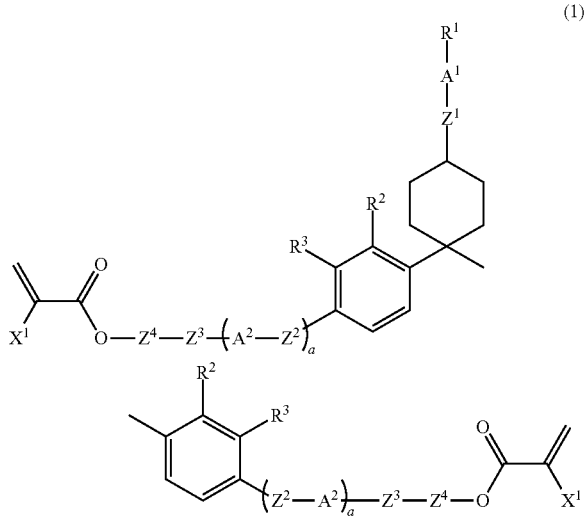

wherein,
$R^1$ is hydrogen or alkyl having 1 to 20 carbons, and in the alkyl, arbitrary —$CH_2$— may be replaced by —O—, —CH=CH— or —C≡C—;
$R^2$ and $R^3$ are independently hydrogen or methyl;
$A^1$ is a single bond, 1,4-phenylene or 1,4-cyclohexylene;
$A^2$ is independently 1,4-phenylene or 1,4-cyclohexylene; and in 1,4-phenylene and 1,4-cyclohexylene in $A^1$ and $A^2$, arbitrary hydrogen may be replaced by halogen;
$Z^1$ is a single bond or alkylene having 1 to 3 carbons;
$Z^2$ is independently —O—, —COO—, —OCO— or alkylene having 1 to 6 carbons;
$Z^3$ is independently a single bond or —O—;
$Z^4$ is independently a single bond or alkylene having 2 to 20 carbons, and in the alkylene, arbitrary —$CH_2$— may be replaced by —O—;
$X^1$ is independently hydrogen, halogen, alkyl having 1 to 3 carbons or fluoroalkyl having 1 to 3 carbons; and
a is independently 0 or 1,
however, when a is 0, $R^2$, $R^3$ and $X^1$ are hydrogen, and $A^1$, $Z^1$, $Z^3$ and $Z^4$ are a single bond, $R^1$ is alkyl having 4 to 20 carbons, and arbitrary —$CH_2$— in the alkyl may be replaced by —O—, —CH=CH—, or —C≡C—;
when a is 0, $R^2$ is hydrogen, $X^1$ is hydrogen or methyl, $R^3$ is methyl, and $A^1$, $Z^1$, $Z^3$ and $Z^4$ are a single bond, $R^1$ is alkyl having 1 to 20 carbons, and in the alkyl, arbitrary —$CH_2$— may be replaced by —O—, —CH=CH— or —C≡C—;
when a is 0, $R^2$ and $R^3$ are hydrogen, $X^1$ is methyl, and $A^1$, $Z^1$, $Z^3$ and $Z^4$ are a single bond, $R^1$ is alkyl having 2 to 20 carbons, and in the alkyl, arbitrary —$CH_2$— may be replaced by —O—, —CH=CH— or —C≡C—;
when a is 0, $X^1$ is methyl, $R^2$ and $R^3$ are hydrogen, and $A^1$ and $Z^1$ are a single bond, $R^1$ is a single bond or alkyl having 1 to 4 carbons, and $Z^3$ is —O—, $Z^4$ is alkylene having 3 to 20 carbons; and
when a is 0, $X^1$, $R^1$, $R^2$ and $R^3$ are hydrogen, $A^1$ and $Z^1$ are a single bond, and $Z^3$ is —O—, $Z^4$ is alkylene having 3 to 20 carbons.

2. The compound according to claim 1, wherein, in formula (1), $A^1$ is 1,4-phenylene or 1,4-cyclohexylene.

3. The compound according to claim 2, wherein, in formula (1), $R^1$ is hydrogen or alkyl having 1 to 10 carbons, $A^1$ is 1,4-cyclohexylene, $Z^2$ is independently —O—, —COO—, —OCO— or —$CH_2$—, $Z^4$ is independently a single bond or alkylene having 2 to 10 carbons, and $X^1$ is independently hydrogen, fluorine, methyl or trifluoromethyl.

4. The compound according to claim 1, wherein, in formula (1), $R^2$ is methyl.

5. The compound according to claim 4, wherein, in formula (1), $A^1$ and $Z^1$ are a single bond.

6. The compound according to claim 5, wherein, in formula (1), $R^1$ is hydrogen or alkyl having 1 to 10 carbons, $Z^2$ is independently —O—, —COO—, —OCO— or —$CH_2$—, $Z^3$ is independently a single bond or —O—, $Z^4$ is independently a single bond or alkylene having 2 to 10 carbons, $X^1$ is independently hydrogen, fluorine, methyl or trifluoromethyl, and a is independently 0 or 1.

7. The compound according to claim 1, wherein, in formula (1), a is 1.

8. The compound according to claim 7, wherein, in formula (1), $A^1$ and $Z^1$ are a single bond.

9. The compound according to claim 8, wherein, in formula (1), $R^1$ is hydrogen or alkyl having 1 to 10 carbons, $Z^2$ is independently —O—, —COO—, —OCO— or —$CH_2$—, $Z^3$ is independently a single bond or —O—, $Z^4$ is independently a single bond or alkylene having 2 to 10 carbons, and $X^1$ is independently hydrogen, fluorine, methyl or trifluoromethyl.

10. The compound according to claim 1, wherein, in formula (1), a is 0.

11. The compound according to claim 10, wherein, in formula (1), $A^1$ and $Z^1$ are a single bond.

12. The compound according to claim 11, being any one of the compounds described below, wherein:
$X^1$ is hydrogen, $Z^3$ and $Z^4$ are a single bond and $R^1$ is alkyl having 2, or 4 to 10 carbons; or
$X^1$ is hydrogen or methyl, $Z^3$ is a single bond or —O—, $Z^4$ is alkylene having 3 to 10 carbons,
$R^1$ is hydrogen or alkyl having 1 to 10 carbons; or
$X^1$ is fluorine, chlorine or trifluoromethyl, $Z^3$ is a single bond or —O—, $Z^4$ is a single bond or alkylene having 2 to 10 carbons, and $R^1$ is hydrogen or alkyl having 1 to 10 carbons.

13. A composition containing the compound according to claim 1.

14. The composition according to claim 13, comprising adding the compound according to claim 1 to a non-polymerizable liquid crystal composition.

15. A polymer obtained by polymerizing the compound according to claim 1.

16. A polymer obtained by polymerizing the composition according to claim 13.

17. A liquid crystal display device comprising at least any one of the compound according to claim 1.

* * * * *